United States Patent
Guedalia et al.

(10) Patent No.: US 9,536,072 B2
(45) Date of Patent: Jan. 3, 2017

(54) MACHINE-LEARNING BEHAVIORAL ANALYSIS TO DETECT DEVICE THEFT AND UNAUTHORIZED DEVICE USAGE

(71) Applicant: QUALCOMM Incorporated, San Diego, CA (US)

(72) Inventors: Isaac David Guedalia, Beit-Shemesh (IL); Adam Schwartz, Beit-Shemesh (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/682,838

(22) Filed: Apr. 9, 2015

(65) Prior Publication Data

US 2016/0300049 A1    Oct. 13, 2016

(51) Int. Cl.
| | | |
|---|---|---|
| G06F 21/31 | (2013.01) | |
| G06F 21/88 | (2013.01) | |
| G06N 99/00 | (2010.01) | |
| G06N 5/04 | (2006.01) | |

(52) U.S. Cl.
CPC ............ *G06F 21/316* (2013.01); *G06F 21/88* (2013.01); *G06N 5/047* (2013.01); *G06N 99/005* (2013.01)

(58) Field of Classification Search
None
See application file for complete search history.

(56) References Cited

U.S. PATENT DOCUMENTS

| 7,356,462 B2 | 4/2008 | Bangalore et al. |
| 7,689,418 B2 | 3/2010 | Ramaswamy et al. |
| 8,145,474 B1 | 3/2012 | Daily et al. |

(Continued)

OTHER PUBLICATIONS

Jiang Y., et al., "Towards reengineering web sites to web-services providers", Software Maintenance and Reengineering, 2004. CSMR 2004. Proceedings. Eighth European Conference on Tampere, Finland Mar. 24-26, 2004, Piscataway, NJ, USA,IEEE, Mar. 24, 2004 (Mar. 24, 2004), pp. 296-305, XP010692157.

(Continued)

*Primary Examiner* — Michael R Vaughan
(74) *Attorney, Agent, or Firm* — Muncy, Geissler, Olds & Lowe, P.C.

(57) ABSTRACT

The disclosure relates to machine-learning behavioral analysis to detect device theft and unauthorized device usage. In particular, during a training phase, an electronic device may generate a local user profile that represents observed user-specific behaviors according to a centroid sequence, wherein the local user profile may be classified into a baseline profile model that represents aggregate behaviors associated with various users over time. Accordingly, during an authentication phase, the electronic device may generate a current user profile model comprising a centroid sequence re-expressing user-specific behaviors observed over an authentication interval, wherein the current user profile model may be compared to plural baseline profile models to identify the baseline profile model closest to the current user profile model. As such, an operator change may be detected where the baseline profile model closest to the current user profile model differs from the baseline profile model in which the electronic device has membership.

35 Claims, 16 Drawing Sheets

(56) References Cited

U.S. PATENT DOCUMENTS

| | | | |
|---|---|---|---|
| 8,214,398 B1* | 7/2012 | Cowan | G06F 21/6218 707/785 |
| 8,245,301 B2 | 8/2012 | Evans et al. | |
| 8,442,812 B2 | 5/2013 | Ehsani et al. | |
| 8,551,186 B1* | 10/2013 | Strand | G06F 21/74 726/35 |
| 8,630,965 B2 | 1/2014 | Savvides et al. | |
| 8,688,980 B2 | 4/2014 | Davis et al. | |
| 8,972,325 B2* | 3/2015 | Varghese | G06N 99/005 706/47 |
| 9,220,011 B1* | 12/2015 | Annan | H04W 12/08 |
| 2005/0097364 A1* | 5/2005 | Edeki | G06F 21/31 726/4 |
| 2007/0005990 A1 | 1/2007 | Sathish | |
| 2007/0113270 A1* | 5/2007 | Kraemer | G06F 21/604 726/4 |
| 2007/0180516 A1* | 8/2007 | Aoki | G06F 21/554 726/17 |
| 2007/0255818 A1 | 11/2007 | Tanzer et al. | |
| 2008/0320539 A1 | 12/2008 | Ohkita | |
| 2009/0292743 A1* | 11/2009 | Bigus | G06F 21/552 |
| 2009/0293121 A1* | 11/2009 | Bigus | G06F 21/316 726/22 |
| 2010/0228767 A1 | 9/2010 | Slinker et al. | |
| 2011/0004580 A1* | 1/2011 | Varghese | G06N 99/005 706/47 |
| 2013/0159550 A1 | 6/2013 | Vasseur | |
| 2013/0173062 A1 | 7/2013 | Koenig-Richardson | |
| 2013/0291099 A1* | 10/2013 | Donfried | G06Q 30/0637 726/22 |
| 2014/0123249 A1* | 5/2014 | Davis | G06F 21/44 726/5 |
| 2014/0195927 A1* | 7/2014 | DeWeese | H04L 63/10 715/750 |
| 2015/0026181 A1* | 1/2015 | Milton | G06Q 30/0269 707/737 |
| 2015/0205958 A1* | 7/2015 | Turgeman | G06F 21/554 726/23 |

OTHER PUBLICATIONS

Manning C G N., et al., "Inferring lexical and grammatical structure from sequences", Compression and Complexity of Sequences 1997. Proceedings Salerno, Italy Jun. 11-13, 1997, Los Alamitos, CA, USA,IEEE Comput. Soc, US, Jun. 11, 1997 (Jun. 11, 1997), pp. 265-274, XP010274909, ISBN: 978-0-8186-8132-5.

Brech B., et al., "The Interconnecting of Everything," IBM Corporation, 2013, pp. 1-6.

Giura P., et al., "Is It Really You? User Identification Via Adaptive Behavior Fingerprinting," CODASPY '14 Proceedings of the 4th ACM conference on Data and application security and privacy, 2014, pp. 333-344.

Guo B., et al., "From the internet of things to embedded intelligence," 2012, pp. 1-29.

Ketabdar H., et al., "Motion and audio analysis in mobile devices for remote monitoring of physical activities and user authentication," Journal of Location Based Services, 2011, vol. 5 (3-4), pp. 182-200.

Lloret J., et al., "Ubiquitous Monitoring of Electrical Household Appliances," Sensors, 2012, vol. 12, pp. 15159-15191.

Schneider S., "Understanding the Protocols Behind the Internet of Things," Electronic Design, 2013, 8 pages.

* cited by examiner

Observed Interactions:
[A] [B] [C] [A] [B] [C] [A] [B] [C] [A]

Derived Grammar:
372 ↱ S -> 4 3 4,
374 ↱ where 1 → AB, 2 → CA, 3 → BC, 4 → 1 2

MACHINE-LEARNING BEHAVIORAL ANALYSIS TO DETECT DEVICE THEFT AND UNAUTHORIZED DEVICE USAGE

TECHNICAL FIELD

Various embodiments described herein generally relate to machine-learning behavioral analysis to detect device theft and unauthorized device usage.

BACKGROUND

Today, electronic devices are widespread. Such electronic devices can provide a user with wireless phone access, Internet access, the ability to perform online transactions (e.g., on-line shopping, on-line banking, etc.) as well as other applications such as finding maps to particular locations, among many other things. As such, many modern electronic devices allow for wireless communication as well as almost all of the Internet features associated with non-mobile computer systems. Examples of such electronic devices include, without limitation, mobile phones, cellular phones, portable computers, desktop computers, personal digital assistants (PDAs), monitors, computer monitors, televisions, tuners, radios, satellite radios, digital music players, portable music players, digital video players, digital video disc (DVD) players, portable digital video players, and so on.

Accordingly, the widespread electronic devices that are available today can increase user productivity and quality of life. Unfortunately, electronic devices (and especially mobile devices) are susceptible to loss, theft, or unauthorized use. Electronic devices often carry private, confidential, and/or difficult-to-replace data, and the loss of such data further compounds the loss of the electronic device. Although an electronic device that has been lost or stolen can be physically replaced, oftentimes the data stored on such an electronic device is confidential and/or irreplaceable. Additionally, the authorized user of a lost or stolen electronic device may have to deal with ramifications such as the misuse of information or someone else gaining access to information stored on the mobile device. Further, in many cases, hours or even days may lapse before the authorized user of the electronic device even discovers the loss, during which time an unauthorized user may be accessing sensitive data, misappropriating information, making national and international phone calls, or riding up charges for goods or service on the authorized use's accounts through on-line purchases and transactions. Furthermore, electronic devices are often used to run diverse applications that originate from many sources, which can sometimes leads to users installing applications with malicious intent (e.g., malware) onto electronic devices without their awareness. For example, unwanted malware may impersonate the authorized user, send unauthorized short message service (SMS) messages (e.g., to conduct transmissions that debit the telecommunication account associated with the electronic device, usually in an attempt to generate revenue for the attacker), steal personal data, or engage in other malicious and/or unauthorized activity.

Previous attempts have been made to prevent unauthorized use or otherwise stop attacks against electronic devices. For example, some electronic devices are equipped with locking features that require a code or personal identification number (PIN) to unlock the electronic device. Unfortunately, many users do not utilize such authorization schemes such that locking features tend to be ineffective, and moreover, thieves can easily overcome such authorization schemes because unlock codes tend to be short and predictable so as to be memorable to users. Furthermore, other previous attempts to stop attacks against electronic devices involve configuring an operating system (OS) to run applications in a "sandbox" intended to prevent unauthorized or undesirable behavior. However, many legitimate applications are used to send SMS messages, place calls, or engage in other behavior that may be restricted in a sandbox, whereby many operating systems allow approved applications to bypass the sandbox restrictions such that attackers can simply encourage or mislead the user to supply such approval, authorization, or agreement in a permission request. Further still, current attempts to detect theft or other unauthorized usage based on behavioral attributes tend to take a naïve approach in measuring an attribute, such as the time from device pick-up (e.g., as sensed with an accelerometer) to the time that the user first interacts with the device and then setting a threshold with respect to the measured attribute to characterize the user. However, defining an accurate threshold tends to be difficult, especially when using an individual feature attribute, whereby the thresholds typically wind up being excessively sensitive (e.g., leading to false positives) or excessively lax (e.g., leading to false negatives).

Accordingly, with the ubiquity of electronic devices and the ever-present threat that electronic devices may potentially be stolen or subject to unauthorized use, improved techniques to detect electronic device theft and unauthorized usage are desired.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, machine-learning behavioral analysis may be used to detect device theft and unauthorized device usage. In particular, during a training phase, an electronic device may generate a local user profile that represents observed user-specific behaviors according to a centroid sequence, wherein the local user profile may be classified into a baseline profile model that represents aggregate behaviors associated with various users over time. Accordingly, during an authentication phase, the electronic device may generate a current user profile model comprising a centroid sequence re-expressing user-specific behaviors observed over an authentication interval, wherein the current user profile model may be compared to plural baseline profile models to identify the baseline profile model closest to the current user profile model. As such, an operator change may be detected where the baseline profile model closest to the current user profile model differs from the baseline profile model in which the electronic device has membership.

According to various aspects, a method for detecting unauthorized electronic device usage may comprise storing plural baseline profile models at an electronic device that may be a member in one of the plural baseline profile models, generating one or more feature vectors representing a temporal context associated with one or more user-specific behaviors observed on an electronic device, generating a current user profile model from the one or more feature vectors, wherein the current user profile model comprises a centroid sequence that re-expresses the temporal context associated with the one or more user-specific behaviors and a data grammar that defines one or more rules to represent patterns in the centroid sequence, comparing the current user profile model generated from the one or more feature vectors to the plural baseline profile models stored at the electronic device to identify one of the plural baseline profile models closest to the current user profile model, and detecting an operator change at the electronic device in response to determining that the baseline profile model closest to the current user profile model differs from the baseline profile model in which the electronic device has membership.

Furthermore, in various embodiments, the method may include a training phase that comprises generating one or more training feature vectors that represent one or more user-specific behaviors observed on the electronic device over a predefined training period, generating a local user profile model from the one or more training feature vectors, wherein the local user profile model re-expresses the user-specific behaviors observed over the predefined training period according to one or more centroids that indicate a temporal context associated therewith, transmitting the local user profile model to a server that executes a clustering algorithm on the local user profile model transmitted from the electronic device and local user profile models transmitted from one or more other electronic devices to create the plural baseline profile models, and receiving, from the server, the plural baseline profile models and information indicating the baseline profile model in which the electronic device has membership.

According to various embodiments, the method may comprise comparing the current user profile model to the plural baseline profile models during an authentication phase, which may comprise calculating one or more metrics that define a distance from the current user profile model to each baseline profile model to quantify a similarity between the data grammar associated with the current user profile model and each baseline profile model and identifying one of the plural baseline profile models having a smallest distance from the current user profile model, wherein the identified baseline profile model corresponds to the baseline profile model closest to the current user profile model. As such, a current operator associated with the electronic device may be authenticated in response to determining that the baseline profile model closest to the current user profile model matches the baseline profile model in which the electronic device has membership. Otherwise, in various embodiments, a recovery action and/or a protective action may be triggered in response to detecting the operator change. Alternatively, in various embodiments, the current user profile model may first be compared to one or more authorized user profile models stored on the electronic device and a notification may be generated to indicate that a current operator is authorized to use the electronic device in response to determining that a distance from the current user profile model to at least one of the authorized user profiles is under a threshold value such that the recovery and/or protective action(s) may be triggered where the distance from the current user profile model to each authorized user profile is above the threshold value.

According to various aspects, an electronic device may comprising means for storing plural baseline profile models, wherein the electronic device has membership in one of the plural baseline profile models, means for generating one or more feature vectors representing a temporal context associated with one or more user-specific behaviors observed from sensor data acquired on the electronic device, means for generating a current user profile model from the one or more feature vectors, wherein the current user profile model comprises a centroid sequence that re-expresses the temporal context associated with the one or more user-specific behaviors and a data grammar that defines one or more rules to represent patterns in the centroid sequence, means for comparing the current user profile model generated from the one or more feature vectors to the plural baseline profile models to identify one of the plural baseline profile models closest to the current user profile model, and means for detecting an operator change at the electronic device according to whether the baseline profile model closest to the current user profile model differs from the baseline profile model in which the electronic device has membership.

According to various aspects, an electronic device may comprise a local repository configured to store plural baseline profile models, wherein the electronic device has membership in one of the plural baseline profile models, one or more sensors configured to acquire sensor data, one or more processors, and a behavioral analysis and user authentication platform configured to execute on the one or more processors, wherein the behavioral analysis and user authentication platform may comprise an observation module configured to generate one or more feature vectors representing a temporal context associated with one or more user-specific behaviors observed from the acquired sensor data, a clustering module configured to map the one or more feature vectors to a centroid sequence that re-expresses the temporal context associated with the one or more user-specific behaviors, a grammar module configured to generate a current user profile model, wherein the current user profile model comprises the centroid sequence mapped to the one or more feature vectors and a data grammar that defines one or more rules to represent patterns in the centroid sequence, and a comparison module configured to identify the baseline profile model closest to the current user profile model and detect an operator change according to whether the closest baseline profile model differs from the baseline profile model in which the electronic device has membership.

According to various aspects, a computer-readable storage medium may have computer-executable instructions recorded thereon, wherein executing the computer-executable instructions on an electronic device having one or more processors may cause the one or more processors to store plural baseline profile models, wherein the electronic device has membership in one of the plural baseline profile models, generate one or more feature vectors representing a temporal context associated with one or more user-specific behaviors observed from sensor data acquired on the electronic device, generate a current user profile model from the one or more feature vectors, wherein the current user profile model comprises a centroid sequence that re-expresses the temporal context associated with the one or more user-specific behaviors and a data grammar that defines one or more rules to represent patterns in the centroid sequence, compare the current user profile model generated from the one or more feature vectors to the plural baseline profile models to identify one of the plural baseline profile models closest to the current user profile model, and detect an operator change at the electronic device according to whether the baseline profile model closest to the current user profile model differs from the baseline profile model in which the electronic device has membership.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1A:
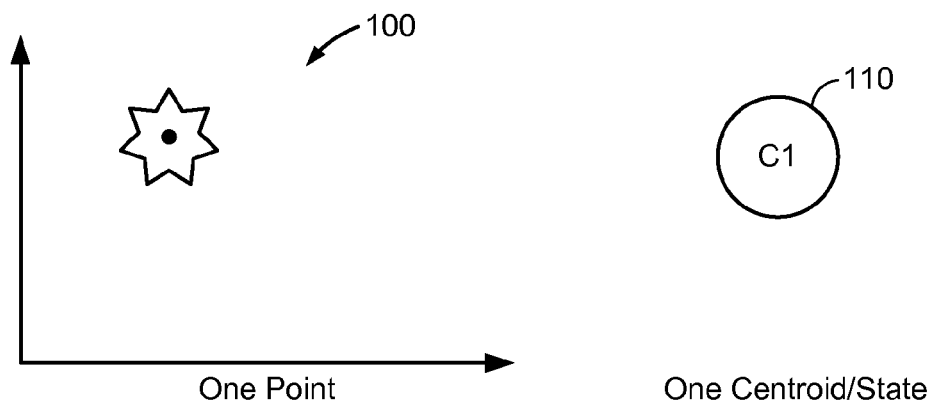
FIG. 1A-1D illustrate various examples in which a scattergram can be converted to a state machine, according to various aspects.
Figure 1B:
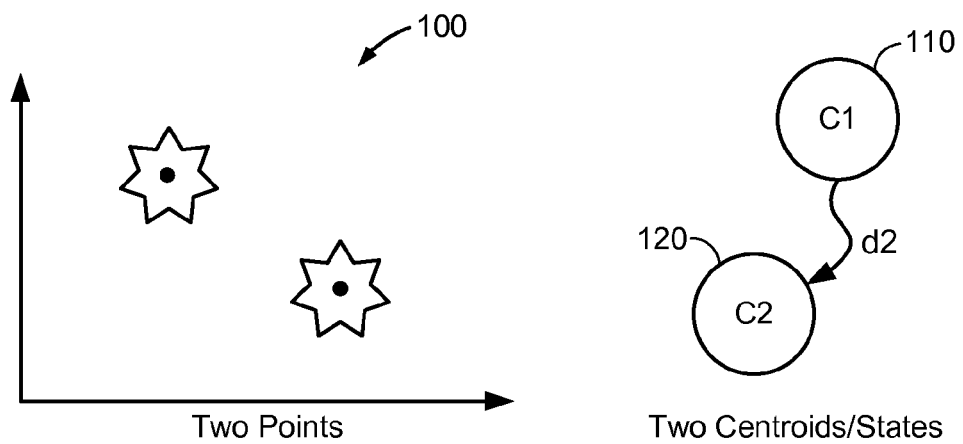

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "client device," "user equipment" (or "UE"), "user terminal," "user device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof are used interchangeably to refer to any suitable mobile or stationary device that may operate that can communicate with a radio access network (RAN) that implements a particular radio access technology (RAT), over a wired network, over a Wi-Fi networks (e.g., based on IEEE 802.11, etc.), and/or with other devices over direct device-to-device (D2D) or peer-to-peer (P2P) connections.

Furthermore, as used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have an active communication interface, such as a modem, a transceiver, a transmitter-receiver, or the like, a passive interface (e.g., a quick response (QR) code, a radio-frequency identification (RFID) tag, an NFC tag, etc.), and/or any suitable combination thereof. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to a personal network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the personal network. IoT devices may also include cell phones, desktop computers, laptop computers, tablet computers, personal digital assistants (PDAs), etc. Accordingly, the personal network may be comprised of a combination of "legacy" Internet-accessible devices (e.g., laptop or desktop computers, cell phones, etc.) in addition to devices that do not typically have Internet-connectivity (e.g., dishwashers, etc.).

According to various aspects, grammars are becoming an increasingly important way to analyze data streams. More particularly, generative grammars naturally treat data streams as narratives that can help to reveal inherent structures, which may have practical applications in fields that include device security, unsupervised classification, taxonomy generation, nearest neighbor searching, scientific discovery, vector quantization, speech recognition, text analysis, and navigation, among other things. Because grammars typically group data points into clusters and thereby offer at least some level of compression, grammars are typically measured and compared with respect to the compression ratios associated therewith. However, more information can be obtained from the grammar than just the percentage of space saved. For example, grammars may be measured both syntactically and semantically according to the both the form and content associated therewith. In that sense, different grammars can be compared via appropriate metrics to reach conclusions about the relative similarities and/or differences between the sources associated with the underlying data streams, which can yield deeper understanding about the data in an unsupervised manner. For example, grammars that are syntactically similar may reveal one kind of relationship, whereas grammars that are semantically similar may point to a different kind of relationship. As such, because many electronic devices have built-in sensors, instrumentation, and other monitoring capabilities, the various aspects and embodiments described herein may leverage the capabilities that many electronic devices have to observe local behaviors in order to create data grammars that can model behavior associated with an authorized user, which can be compared to a grammar that models subsequent behavior on the electronic device to detect potential theft or unauthorized usage using various distance metrics that quantify certain grammar properties and thereby enable comparisons that may yield insight into relationships between the sources (e.g., users) associated with the modeled behavior re-expressed in the compared grammars.

Accordingly, as used herein, the generic term "device" may refer to an IoT device, a client device, a UE, a user terminal, a user device, a communication device, a wireless device, a wireless communications device, a handheld device, a mobile device, a mobile terminal, a mobile station, a handset, an access terminal, a subscriber device, a subscriber terminal, a subscriber station, a terminal, a desktop computer, a laptop computer, a tablet computer, a server computer, or any other suitable machine that can generate a data stream that includes one or more data items or other suitable objects that can be expressed according to points, feature vectors, or other suitable data representing behavior observed on the device, which can then be grouped or otherwise arranged into clusters that can symbolize multiple similar or otherwise related data items. For example, in the various aspects and embodiments described herein, the clusters (and specifically the centroids associated with the clusters) may represent proxies that re-express the data items in the original sequenced data streams that are grouped or otherwise arranged into the clusters.

Accordingly, in the various aspects and embodiments described herein, the terms "grammar," "data grammar," "generative grammar," "cluster grammar," and other variants thereof may refer to a data structure or other suitable construct that include one or more rules that represent repeated patterns, structures, sub-patterns, and sub-structures that appear in sequenced clusters that are distilled from sequenced items in original data streams that certain devices may have generated, whereby the grammar rules may note the repeated patterns, structures, sub-patterns, sub-structures, etc. in the sequenced clusters to thereby compress the original data streams while preserving a time sequence associated with the sequenced data items in the original data streams. Accordingly, the sequenced data items in the original data streams can then be reconstituted from the grammar rules, which may comprise flat rules that only include original symbols or data items appearing in the original data streams and/or hierarchical rules that reference other rules, wherein the hierarchical rules may be nested and flattened to enable analysis and comparisons according to various distance metrics that can quantify grammar properties to indicate semantic and/or syntactic similarities among different rules and/or different grammars and provide insight into relationships among the devices that generated the original data streams based on data narratives that emerge from the sequenced clusters that the grammars represent.

More particularly, assuming an original data stream that includes one or more data items arranged according to a time sequence such that the data items to be clustered are available as points (or vectors) in a d-dimensional Euclidean space, clustering may place the data items into groups such that the items placed into a particular cluster are considered more "similar" to one another than to items that are placed into other clusters. For example, one common clustering algorithm is the k-means clustering algorithm, which generally seeks a minimum variance data grouping that minimizes the sum of squared Euclidean distances from certain cluster centroids that can represent proxies to replace or otherwise re-express the original data items placed into the clusters. In general, the k-means algorithm includes four steps: (i) an initialization step in which k starting points may be selected randomly or according to some heuristic, (ii) a distance calculation step in which a Euclidean distance to each cluster centroid may be computed for each data point such that each data point can be assigned to a closest cluster centroid, (iii) a centroid recalculation step in which each cluster centroid may be recalculated according to the average data points assigned thereto, and (iv) a convergence step in which steps (ii) and (iii) are repeated until some convergence condition has been satisfied. Accordingly, clustering algorithms may produce clusters that can each symbolize many similar data items, thereby compressing the original data set because the clusters centroids can effectively replace or otherwise re-express many original data items.

More particularly, according to various aspects, clustering may start with data collection in which original data streams that each include multiple sequenced data items a are collected at a behavioral analysis system, which may reside on a server, an electronic device, or another suitable entity having sufficient processing capabilities to conduct behavioral analysis. The behavioral analysis system may then analyze the sequenced data items to generate one or more feature vectors representing certain characteristics associated with the sequenced data items, wherein the feature vectors can then be statistically clustered to assign each feature vector to a centroid and thereby group the sequenced data items into sequenced clusters. Accordingly, the behavioral analysis system can then re-express each original data item expressed according to the centroid in which the original data item was grouped and construct a grammar from the resulting centroid sequence. For example, to create the clusters and the resulting grammars, the behavioral analysis system can first generate a scattergram and subsequently convert the scattergram to a state model, wherein the scattergram may depict structured knowledge and the state diagram may depict a data narrative that emerges from the original data streams re-expressed therein. Accordingly, the state diagram may generally capture more information than the scattergram, and the resulting data narrative can be further analyzed and compressed according to grammar substitution rules that are based on repeated substructures in the cluster sequence.

Figure 1C:
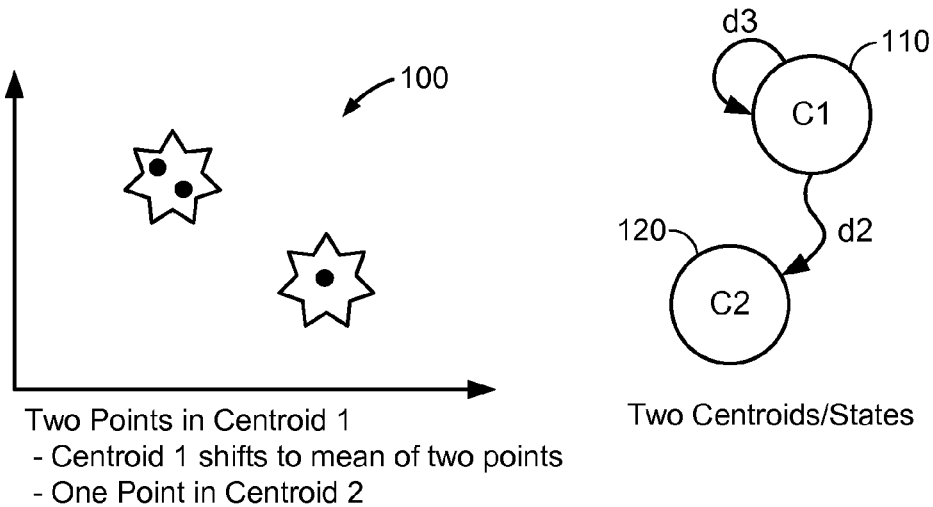
Figure 1D:
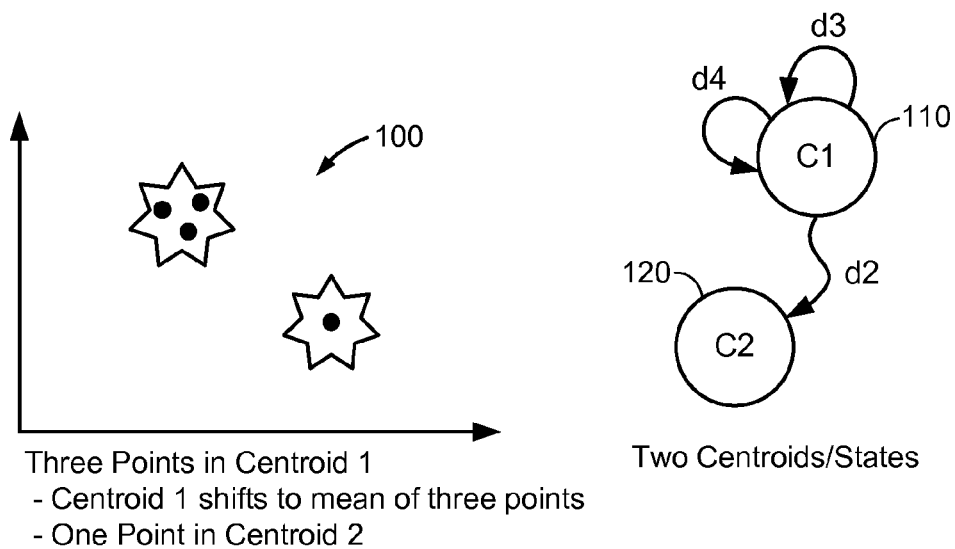

More particularly, according to various aspects, FIG. 1A through FIG. 1D illustrate various examples to demonstrate how a scattergram can be created and then converted into a state machine. In FIG. 1A through FIG. 1D, the behavioral analysis system that collects the original data streams may generally place the data items contained therein into clusters, find the centroids associated with the clusters, define the axes, and map the data to a state machine, where each centroid may represent a state and each data point may represent a state transition. For example, in FIG. 1A, a scattergram 100 includes one point, which corresponds to one centroid or state C1 110. Furthermore, in FIG. 1B, a second point has been added to the scattergram 100, where the second point is placed in a separate cluster with a second centroid or state C2 120 and the second data point indicates a transition "d2" from centroid/state C1 110 to centroid/state C2 120. In FIG. 1C, a third point has been added to the scattergram 100 and placed into centroid/state C1 110, which now includes two points and has been shifted to the mean associated with the two points. Furthermore, because the first and third points have been placed in the same centroid/state C1 110, the first point and the third point may be considered more "similar" to each other than the second point placed in centroid/state C1 120, and the third data point indicates a transition "d3" from centroid/state C1 110 back to centroid/state C1 110. In FIG. 1D, a fourth point has been added to the scattergram 100 and also placed into centroid/state C1 110, which now includes three points and has been shifted to the mean associated with the first, third, and fourth points placed therein. Furthermore, as with the first and third points, the fourth point placed into the same centroid/state C1 110 as the first and third points may therefore be considered more "similar" to the first and third points than the second point, and in a similar respect to the third point, the fourth point indicates a transition "d4" from centroid/state C1 110 back to centroid/state C1 110 to reflect a distance between the fourth point and the centroid/state C1 110 into which the fourth point was placed.

Figure 2:
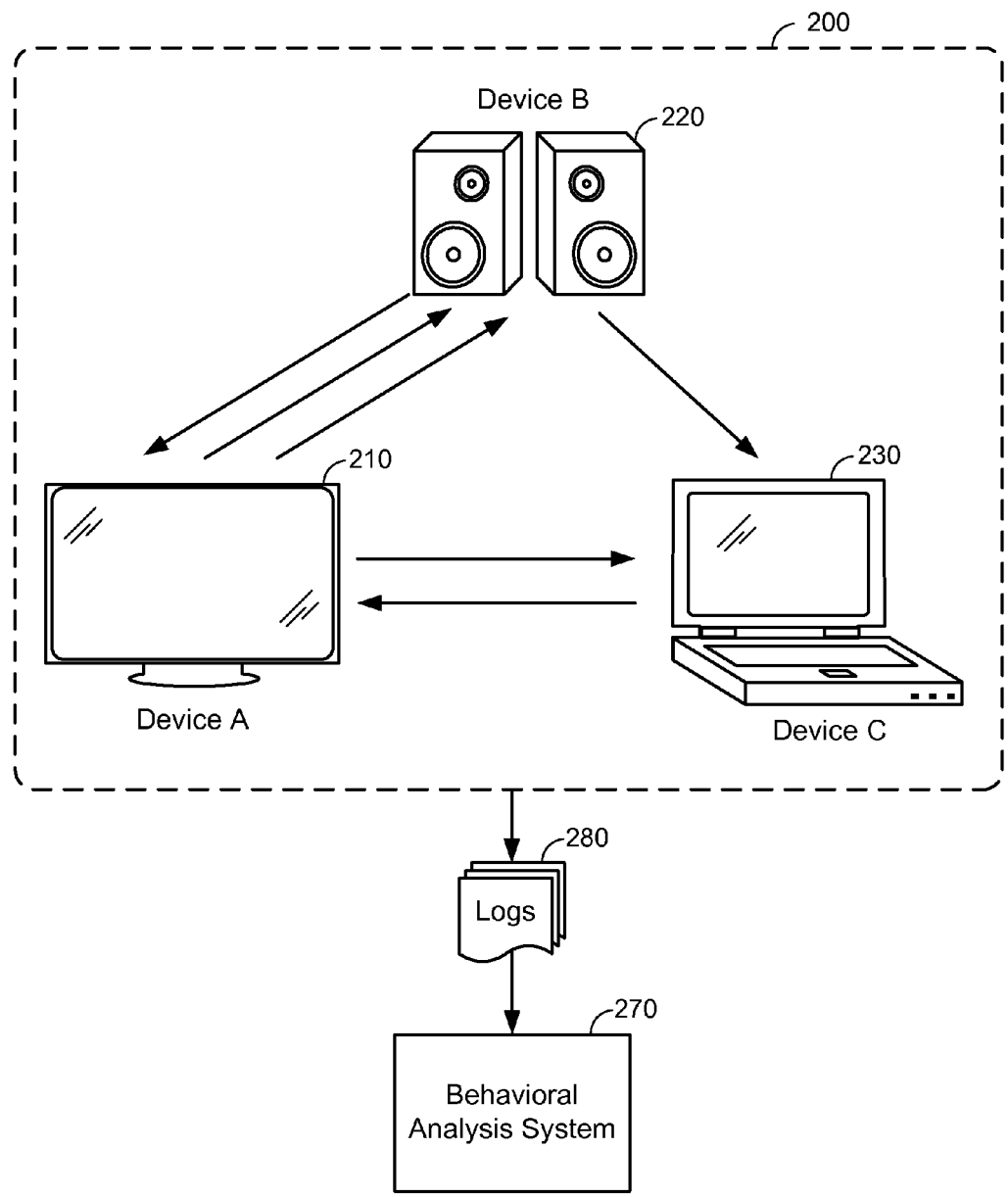
FIG. 2 illustrates an exemplary interaction sequence among various devices that can be analyzed and re-expressed according to a grammar to symbolize the sequenced interactions among the various devices, according to various aspects.

After generating the scattergram 100 to place the four original data points into the centroids/states C1 110, C2 120 and further representing the transitions d2, d3, d4 among the centroids/states C1 110, C2 120 to re-express the sequence associated with the four original data points, a grammar can then be constructed to describe or otherwise re-express the sequenced original data points. For example, according to various aspects, FIG. 2 illustrates an exemplary interaction sequence among various devices that can be analyzed and re-expressed according to a grammar to symbolize the sequenced interactions among the various devices. More particularly, FIG. 2 may generally illustrate an environment 200 (e.g., an IoT network or other suitable environment) that includes Device A 210, Device B 220, and Device C 230, where the various arrows between devices 210-230 illustrate sequenced interactions among the various devices 210-230. Furthermore, in various embodiments, the sequenced interactions among the various devices 210-230 may be detected and logged at the devices 210-230 from a local perspective, at an intermediary node (not shown) such as a packet sniffer, monitoring agent, or other suitable entity, at one of the devices 210-230 that acts as the intermediary node to detect and log the sequenced interactions, or any suitable combination thereof. In any case, the sequenced interactions among the devices 210-230 may be transmitted to a behavioral analysis system 270 within one or more logs 280 that represent or otherwise describe the sequenced interactions. The behavioral analysis system 270 may then generate one or more feature vectors from the sequenced interactions represented in the logs 280, cluster the feature vectors into one or more sequenced centroids, and construct a grammar from the resulting sequenced centroids.

Accordingly, in various embodiments, the original sequenced interactions that are represented in the logs 280 can be re-expressed according to the new centroid (or cluster) sequence, where each original interaction may be replaced with the centroid (or cluster) into which the original interaction was placed. Furthermore, in various embodiments, the sequenced centroids that form the grammar re-expressing the original interaction sequences can be further analyzed and compressed according to grammar substitution rules that note repeated substructures in the sequenced centroids that form the grammar. For example, in FIG. 2, the sequence of interactions represented in the logs 280 includes an interaction [A] [B] to represent Device A 210 interacting with Device B 220, an interaction [C] [A] to represent Device C 230 interacting with Device A 210, an interaction [B] [A] to represent Device B 220 interacting with Device A 210, and an interaction [C] [A] to represent another instance in which Device C 230 interacts with Device A 210, resulting in the overall interaction sequence [A] [B] [C] [A] [B] [A] [C] [A]. The behavioral analysis system 270 may then use the Sequitur (or Nevill-Manning) algorithm to construct a grammar based on the original sequence, wherein the Sequitur algorithm may generally infer a hierarchical structure (e.g., a context-free grammar) from a discrete symbol sequence and substitute repeating substructures in the symbol sequence to compress the original data while preserving the sequence associated therewith.

For example, the Sequitur algorithm may generally start with a sequenced string that includes multiple "terminal symbols" that correspond to elementary lexical symbols, which may be defined in the grammar language and used to produce one or more rules that constitute the grammar, whereas "nonterminal symbols" (or syntactic variables) correspond to symbols that can be replaced with grouped terminal symbols according to the rules associated with the grammar. Accordingly, in the above interaction sequence [A] [B] [C] [A] [B] [A] [C] [A], the terminal symbols may comprise [A], [B], and [C]. To construct the grammar from the interaction sequence, the behavioral analysis system 270 initially scans the sequenced terminal symbols and builds a list that indicates each symbol pair read therein (e.g., [A] [B], [C] [A], and [B] [A]). Each second or subsequent instance associated with a particular symbol pair may then be replaced in the sequence with a nonterminal symbol, and the scanning may continue until the entire sequence has been processed. Accordingly, in FIG. 2, the original interaction sequence [A] [B] [C] [A] [B] [A] [C] [A] may be re-expressed according to a grammar having a symbol sequence 272 that comprises S→1 2 3 2 to represent one or more repeated patterns (or rules) 274, where "1" indicates a non-terminal symbol that can replace terminal symbol pair [A] [B] in the symbol sequence 272, "2" indicates a non-terminal symbol that can replace terminal symbol pair [C] [A] in the symbol sequence 272, and "3" indicates a non-terminal symbol that can replace terminal symbol pair [B] [A] in the symbol sequence 272.

Figure 3:
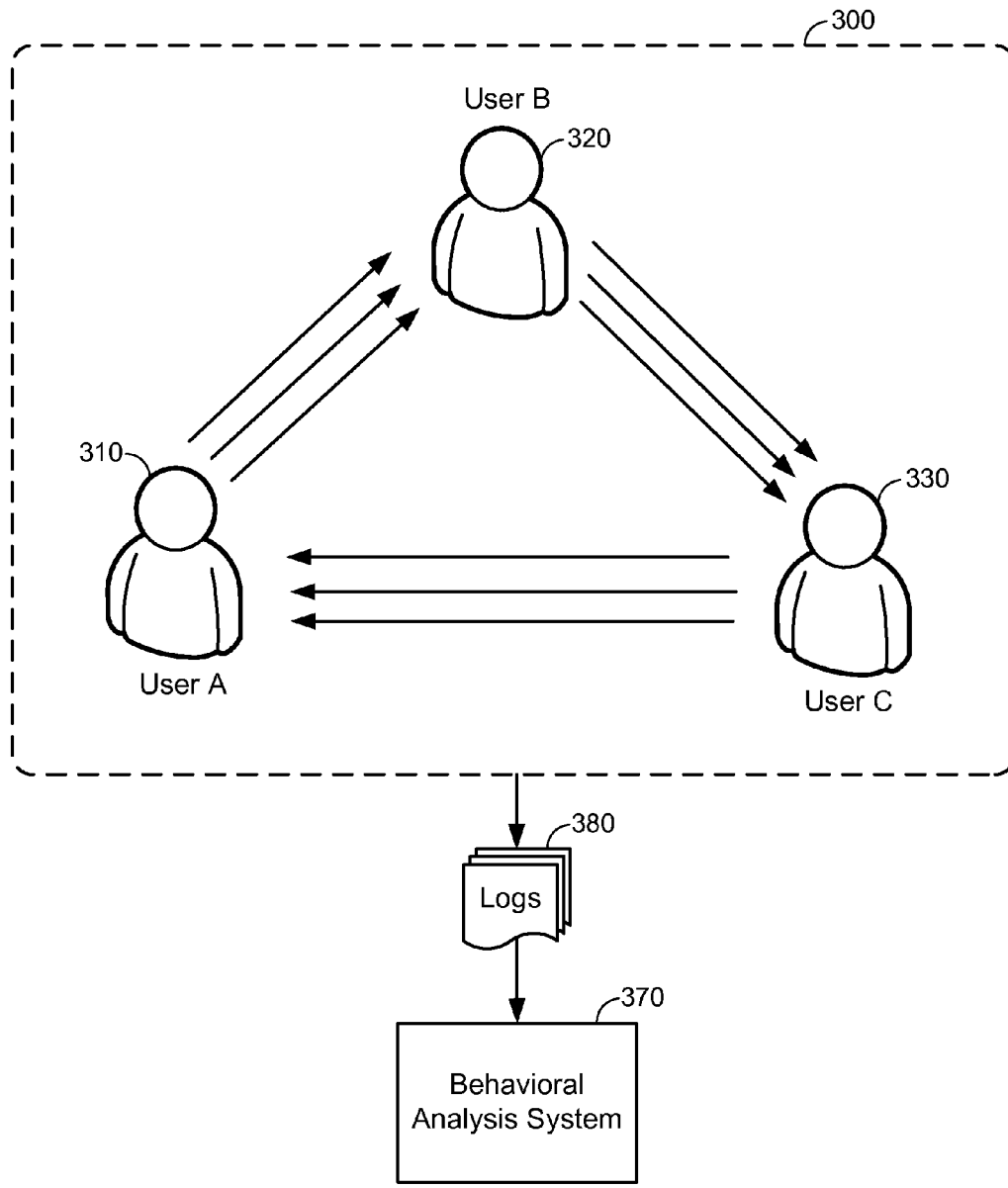
FIG. 3 illustrates an exemplary sequence in which proximity detections between a first user, a second user, and a third user can be re-expressed according to a grammar that symbolizes the proximity detections, according to various aspects.

Furthermore, in various embodiments, the techniques described above can be used to determine various other relationships (e.g., among users based on proximity to one another). For example, according to various aspects, FIG. 3 illustrates an exemplary sequence in which proximity detections between a first user 310, a second user 320, and a third user 330 that occur in an environment 300 can be re-expressed according to a grammar that symbolizes the proximity detections, which may be detected at devices (e.g., smartphones) associated with the users 310, 320, 330. In FIG. 3, the various arrows between the users 310, 320, 330 illustrate the users 310, 320, 330 coming into proximity with each other, whereby one or more logs 380 representing the sequenced proximity detections may be transmitted to the behavioral analysis system 370, wherein the behavioral analysis system 370 may then construct a grammar to re-express the sequenced proximity detections. For example, in FIG. 3, the logs 380 represent the proximity detection sequence [A] [B] [C] [A] [B] [C] [A] [B] [C] [A], which may be re-expressed according to a grammar in which a symbol sequence 372 comprises S→4 3 4 to represent one or more repeated patterns (or rules) 374, where the non-terminal symbol "1" represents proximity detection pair [A] [B], the non-terminal symbol "2" represents proximity detection pair [C] [A], the non-terminal symbol "3" represents proximity detection pair [B] [C], and the non-terminal symbol "4" represents non-terminal symbol pair [1] [2] (i.e., terminal symbol sequence [A] [B] [C] [A]). In various embodiments, the behavioral analysis system 370 can then define one or more actions to occur in the environment 300 in response to detecting the constructed grammar. For example, the behavioral analysis system 370 may determine the actions to perform through prior knowledge, expert system analysis, and/or previous examples from other environments (e.g., if the users 310, 320, 330 typically turn on the television and change lighting to television mode when coming into proximity to one another, the action triggered in response to detecting the grammar may be to turn on a surround sound speaker system whenever the grammar is detected).

Accordingly, in the various aspects and embodiments described herein, a grammar may generally comprise one or more rules generated from an original symbol sequence, usually characters arranged in a string, via the Sequitur algorithm that compresses data and preserves the original sequence. As such, the grammar rules may represent patterns and sub-patterns distilled from the original symbol sequence, which can then be reconstituted from the grammar rules. For example, in various embodiments, a grammar may comprise flat rules that consist only of the terminal symbols in the original sequence, hierarchical rules that reference other rules, and/or nested hierarchical rules that are flattened to enable analysis and comparison. Furthermore, additional properties associated with a grammar can include a length or count indicating how many symbols comprise the string or rule, a count indicating how many unique symbols appear in the string or rule, and/or a count indicating how many rules the grammar includes. In that context, an example original string and example rules forming a grammar are shown below:

Original String
  a b a d c d a d c d a d c d c d a d c d b a d a
    clusters have been symbolized with letters in the alphabet
Rules may be nested and may contain non-terminal symbols
  Rule 0→a b 1 1 1 c d 1 b 2 a
  Rule 1→2 c d # Note that Rule 1 references Rule 2
  Rule 2→a d # Note that nested Rule 2 only has terminal symbols
Flatten all rules except the zeroth rule such that only terminal symbols remain
  Rule 0→a b 1 1 1 c d 1 b 2 a # Zeroth rule has not been expanded
  Rule 1→a d c d # Rule 2 has been replaced with the component symbols
  Rule 2→a d Accordingly, in the various aspects and embodiments described herein, various sequenced data items in an original data stream can be placed into sequenced clusters that essentially replace or otherwise re-express the original data items, wherein a data narrative may emerge from the sequenced clusters that re-express the sequenced data items in the original data stream. The data narrative can then be further analyzed and compressed according to substitution rules associated with the grammar that comprises the sequenced clusters, wherein the grammar may note repeated patterns, structures, sub-patterns, sub-structures in the sequenced clusters to create rules from the data narrative. As such, in various embodiments, different resulting cluster grammars can be compared to determine the similarity or closeness between the data items used to form the cluster grammars, and in a similar respect, the cluster grammars can be compared to determine relationships between devices or other sources associated with the original data streams used to form the cluster grammars (e.g., where devices having similar cluster grammars may signify that users associated with the devices have a closer relationship than users associated with devices that have dissimilar cluster grammars). In that context, the following description details various grammar distance metrics that can quantify the closeness between two grammars, whereby appropriate relationship analysis applications can leverage the grammar distance metrics to infer or otherwise determine relationships based on grammar comparisons.

Figure 4:
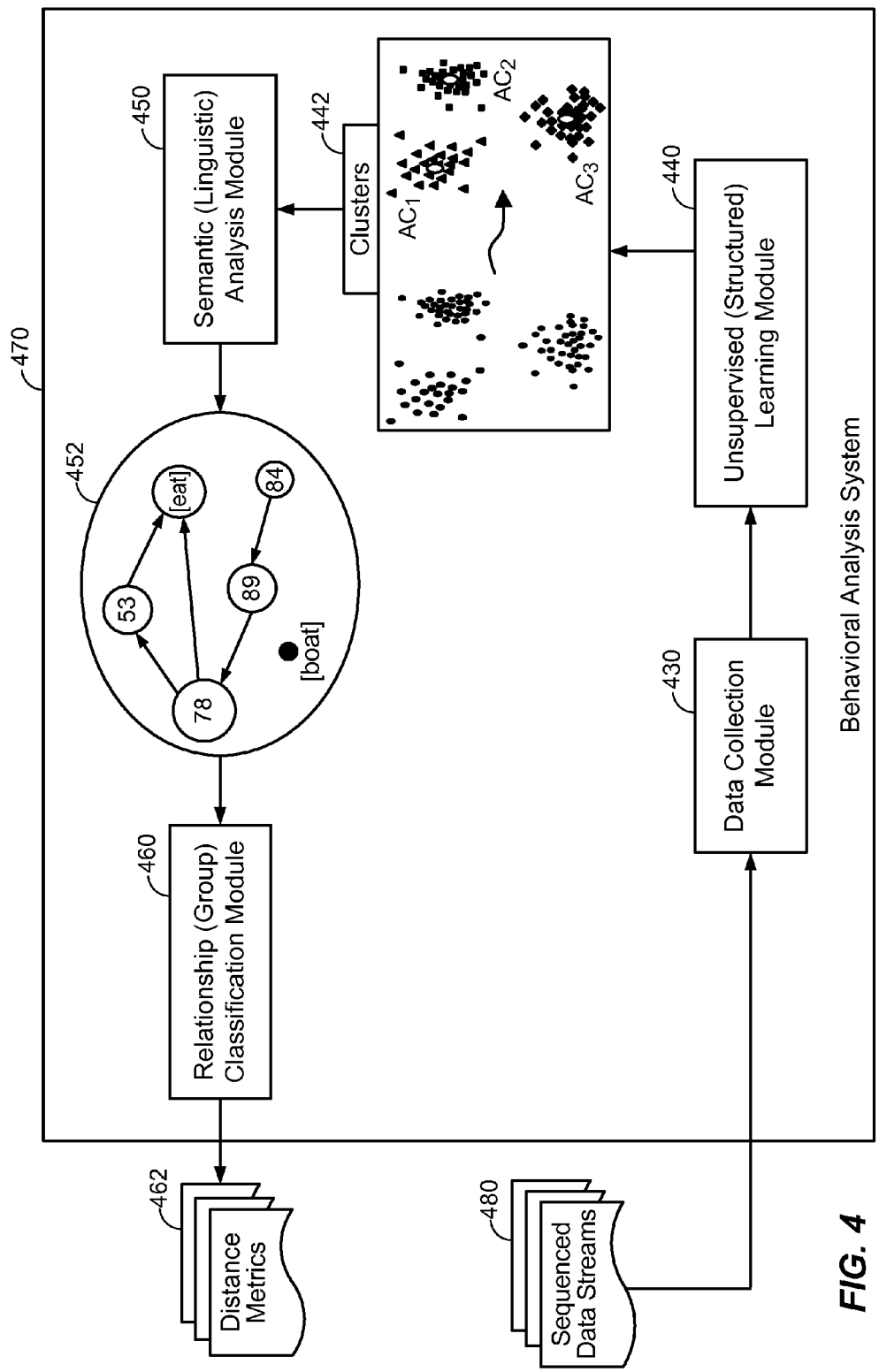
FIG. 4 illustrates an exemplary environment in which sequenced data streams may be re-expressed according to sequenced clusters from which grammars can be constructed and compared to quantify similarities or otherwise analyze relationships among the sources associated with the sequenced data streams, according to various aspects.

More particularly, according to various aspects, FIG. 4 illustrates an exemplary environment in which original sequenced data streams 480 may be re-expressed according to sequenced clusters 442, which can then be used to construct grammars 452 that may be compared to calculate one or more distance metrics 462. In particular, the distance metrics 462 may generally quantify syntactic similarities and semantic similarities between the grammars 452, which may provide insight to learn relationships among sources associated with the sequenced data streams 480. For example, in various embodiments, the sources associated with the sequenced data streams 480 may comprise various different devices, in which case the distance metrics 462 calculated from comparing the grammars 452 that are constructed from the sequenced clusters 442 may quantify similarities in syntactic form and semantic meaning with respect to the data streams 480 that the different devices generate (e.g., according to interactions that occur between the devices, as in FIG. 2, according to interactions between users associated with the devices, as in FIG. 3, etc.). Furthermore, in various embodiments, the sequenced data streams 480 may comprise certain user-specific behaviors that are observed on one or more electronic devices, wherein the clusters 442 that re-express the observed user-specific behaviors and the resulting data grammars 452 may be combined to form a base profile model that represents the specific user in terms that relate to the manner in which the user behaves when interacting with the electronic device. In that context, subsequent behavior observed on the electronic device may be used to create a new profile model that represents a behavior snapshot over a comparatively short time period (e.g., relative to the observed behavior used to create the base profile model), wherein the distance metrics 462 may be calculated from a comparison between the new profile model and the base profile model. Accordingly, the distance metrics 462 can be used to verify or otherwise authenticate the current user (e.g., where the distance metric(s) 462 used in the comparison are less than a particular threshold) or trigger appropriate action if the distance metric(s) 462 indicate that the user who engaged in the subsequent behavior may differ from the person who engaged in the behavior that resulted in the base profile model (e.g., broadcasting a location, shutting the device down, etc.).

According to various embodiments, as shown in FIG. 4, the clusters 442, grammars 452, and distance metrics 462 may be generated at a behavioral analysis system 470, which may reside on a particular electronic device, on a server, or a combination thereof. For example, when residing on a particular electronic device, the clusters 442, grammars 452, and distance metrics 462 generated at the behavioral analysis system 470 may be used to model and analyze certain behaviors that are observed locally. Furthermore, when residing on a server, the clusters 442, grammars 452, and distance metrics 462 may model behaviors and indicate relationships with respect to various devices and/or users on an individual basis and/or an aggregate basis. Further still, when operated in a distributed manner, various client devices may perform certain behavioral analysis features at a local level, and the server may perform certain behavioral analysis features on an aggregate basis, wherein the aggregate behavioral analysis performed at the server may be used to assist certain behavioral analysis features that the client devices perform on a local level. Additional detail relating to the particular manner in which electronic (e.g., client) devices and a server may cooperate to provide machine learning behavioral analysis will be provided below, especially with respect to FIG. 7 through FIG. 14.

In various embodiments, the sources associated with the original sequenced data streams 480 may provide the sequenced data streams 480 to the behavioral analysis system 470, which may include a data collection module 430 that receives or otherwise collects the original data streams 480. The sequenced data streams 480 may then be provided to an unsupervised (structured) learning module 440 that creates one or more clusters 442 and places each sequenced data item contained in the original data streams 480 into a cluster 442, which may indicate a temporal context associated with the sequenced data item. In various embodiments, a semantic (linguistic) analysis module 450 may then arrange the clusters 442 into a sequence, assign a terminal symbol to each unique cluster 442, and identify one or more repeating patterns, structures, sub-patterns, sub-structures, etc. in the symbol sequence representing the sequenced clusters 442. In various embodiments, the semantic (linguistic) analysis module 450 may then create one or more rules to represent the repeating patterns, structures, sub-patterns, sub-structures, etc. identified in the symbol sequence, create one or more hierarchical and/or nested rules that reference other rules (if applicable), and flatten each rule such that only terminal symbols remain, except that the zeroth rule that represents the original symbol sequence is not flattened. The semantic (linguistic) analysis module 450 may then create one or more grammars 452 from the sequenced clusters 442 and the rules that are created to represent the repeating patterns, structures, sub-patterns, sub-structures, etc. therein, and a relationship (group) classification module 460 may then compare the resulting grammars 452 according to one or more distance metrics 462 that quantify the syntactic and/or semantic similarity therebetween.

For example, to explain the various distance metrics 462 that quantify the closeness between the grammars 452 and thereby provide insight into relationships among the sources associated with the original data streams 480 that resulted in the grammars 452, the following description assumes a use case in which the sources that provided the original data streams 480 to the behavioral analysis system 470 include three devices, referred to herein as "Device A," "Device B," and "Device C." Furthermore, the following description assumes that the grammars 452 formed from the original data streams 480 received from Device A, Device B, and Device C comprise the original strings and rules shown below:

Device A
  Original String
    a b a d c d a d c d a d c d c d a d c d b a d a
    length=24
    unique elements=4
  Flattened Rules; Ignore zeroth rule corresponding to original string
    0→a b 1 1 1 c d 1 b 2 a
    1→a d c d
    2→a d
  Flattened Rule Properties; Ignore zeroth rule corresponding to original string
    {flattened rule lengths:count per length}={4:1, 2:1}
    flattened rule count=2
    total rule length=6
    average rule length=3.00
Device B
  Original String
    b b b a b a d c d a d c d a d c d c b a a c d b a c c
    length=27
    unique elements=4
  Flattened Rules; Ignore zeroth rule corresponding to original string
    0→b b 1 1 2 2 3 c 1 a c d 1 c c
    1→b a
    2→d c d a
    3→d c d
  Flattened Rule Properties; Ignore zeroth rule corresponding to original string
    {flattened rule lengths:count per length}={2:1, 4:1, 3:1}
    flattened rule count=3
    total rule length=9
    average rule length=3.00
Device C
  Original String
    e b e a b b a d c d a d c d a d c d a b c d d a d c c e
    length=28
    unique elements=5
  Flattened Rules; Ignore zeroth rule corresponding to original string
    0→e b e 1 b 2 2 2 1 c d d 3 c e
    1→a b
    2→a d c d
    3→a d c
  Flattened Rule Properties; Ignore zeroth rule corresponding to original string
    {flattened rule lengths:count per length}={2:1, 4:1, 3:1}
    flattened rule count=3
    total rule length=9
    average rule length=3.00

In various embodiments, the behavioral analysis system 470 may calculate one or more distance metrics 462 to quantify syntactic similarities and/or semantic similarities between disparate original data streams 480 using the relationship (group) classification module 460, which may tailor the distance metrics 462 according to the particular application context and data types used to form the resulting cluster grammars 452. In general, the distance metrics 462 can be assumed to be commutative or symmetric, meaning that $D_{A \rightarrow B}$ (i.e., a distance from the grammar 452 associated with Device A to the grammar 452 associated with Device B) will be the same as $D_{B \rightarrow A}$ (i.e., a distance from the grammar 452 associated with Device B to the grammar 452 associated with Device A). Furthermore, each distance metric 462 described in further detail below may be a normalized $L_1$ norm (e.g., a geometric metric 462 in which the distance between two points is the sum of the absolute differences between the Cartesian coordinates associated therewith, sometimes referred to as a Taxicab norm or Manhattan distance), wherein each distance metric 462 may range from zero to one and multiple individual distance metrics 462 may be averaged to determine the total net distance between two grammars 452. Furthermore, as described in more detail below, the grammar distance metrics 462 may be based on aggregate (e.g., global) rule comparisons to quantify similarities in syntactical form and individual (e.g., content-based) rule comparisons to quantify similarities in semantic meaning.

More particularly, in various embodiments, the grammar distance metrics 462 that are based on aggregate rule comparisons may include a rule count distance metric 462 that can quantify the syntactic similarity between two grammars 452 according to the total rule count in the grammars 452 associated with a particular device pair, wherein the rule count distance metric 462 can be calculated according to the following formula, where $\#R_i$ denotes the rule count in the grammar 452 associated with Device i:

$$D \propto \frac{|\#R_A - \#R_B|}{(\#R_A + \#R_B)}$$

Accordingly, based on the above example where the grammar 452 associated with Device A has two flattened rules (i.e., $\#R_A=2$), the grammar 452 associated with Device B has three flattened rules (i.e., $\#R_B=3$), and the grammar 452 associated with Device C has three flattened rules (i.e., $\#R_C=3$), the rule count distance metric 462 associated with each device pair may be calculated as follows:

TABLE 1

Rule Count Distance Metric

| Device Pair | Calculations | Rule Count Distance Metric |
|---|---|---|
| A → B | $\frac{\|2-3\|}{2+3}$ | 0.2000 |
| A → C | $\frac{\|2-3\|}{2+3}$ | 0.2000 |
| B → C | $\frac{\|3-3\|}{3+3}$ | 0.0000 |

In various embodiments, the grammar distance metrics 462 based on aggregate rule comparisons may further include an average rule length distance metric 462 that can quantify the syntactic similarity between two grammars 452 according to a comparison between the average rule length in the grammars 452 associated with each device pair, wherein the average rule length distance metric 462 can be calculated according to the following formula, where $|R_i|$ denotes the length associated with a rule in the grammar 452 associated with Device i, $<|R_i|>$ denotes the average rule length in the grammar 452 associated with Device i, and the rule length refers to the symbol count in each rule:

$$D \propto \frac{|\langle|R_A|\rangle - \langle|R_B|\rangle|}{\langle|R_A|\rangle + \langle|R_B|\rangle}$$

Accordingly, in the above example, the grammar 452 associated with Device A has one rule with four symbols and one rule with two symbols such that $<|R_A|>=3$ and the grammars 452 associated with Device B and Device C each have one rule with two symbols, one rule with four symbols, and one rule with three symbols such that $<|R_B|>=3$ and $<|R_C|>=3$. As such, the average rule length distance metric 462 associated with each device pair may be calculated as follows:

TABLE 2

Average Rule Length Distance Metric

| Device Pair | Calculations | Rule Count Distance Metric |
|---|---|---|
| A → B | $\frac{|3-3|}{3+3}$ | 0.0000 |
| A → C | $\frac{|3-3|}{3+3}$ | 0.0000 |
| B → C | $\frac{|3-3|}{3+3}$ | 0.0000 |

In various embodiments, the grammar distance metrics 462 based on aggregate rule comparisons may further include an equal length rule count metric 462 that can quantify the syntactic similarity between two grammars 452 according to a comparison based on how many rules having an equal length are in the grammars 452 associated with each device pair. In that sense, the equal length rule count metric 462 may differ from the rule count distance metric 462 and the average rule length distance metric 462 in that the equal length rule count metric 462 compares aggregate counts between individual rules, which may quantify a lower-level syntactic similarity between the grammars 452. Accordingly, the equal length rule count metric 462 can be calculated according to the following formula, where $\#|R_{A_i}|$ denotes how many rules in the grammar 452 associated with Device A have length i, and where i further serves as the summation index:

$$D \propto \frac{\sum_i \frac{||\#|R_{A_i}| - \#|R_{B_i}||}{\#|R_{A_i}| + \#|R_{B_i}|}}{\max(\#R_A, \#R_B)}$$

which is equivalent to:

$$D \propto \frac{\sum_i^{max(|R_A|)} \left[1 - 2\frac{\min(\#|R_{A_i}|, \#|R_{B_i}|)}{\#|R_{A_i}| + \#|R_{B_i}|}\right]}{\max(\#R_A, \#R_B)}$$

Accordingly, in the above example where Device A has a grammar 452 that includes one rule having four symbols and one rule having two symbols, Device B has a grammar 452 that includes one rule having two symbols, one rule having four symbols, and one rule having three symbols, and Device C has a grammar 452 that includes one rule having two symbols, one rule having four symbols, and one rule having three symbols, the inputs to the equal length rule count distance metric 462 may be expressed as follows:

TABLE 3

Equal Length Rule Distance Metric - Inputs

| Index | Device A | Device B | Device C |
|---|---|---|---|
| 2 | $\#|R_{A_2}| = 1$ | $\#|R_{B_2}| = 1$ | $\#|R_{C_2}| = 1$ |
| 3 | $\#|R_{A_3}| = 0$ | $\#|R_{B_3}| = 1$ | $\#|R_{C_3}| = 1$ |
| 4 | $\#|R_{A_4}| = 1$ | $\#|R_{B_4}| = 1$ | $\#|R_{C_4}| = 1$ |

Consequently, based on the above inputs to the equal length rule count distance metric, the equal length rule count distance metric 462 associated with each device pair may be calculated according to either of the following two (equivalent) methods:

TABLE 4

Equal Length Rule Distance Metric - Method One

| Device Pair | Calculations | Rule Count Distance Metric |
|---|---|---|
| A → B | $\sum_i \frac{||\#|R_{A_i}| - \#|R_{B_i}||}{\#|R_{A_i}| + \#|R_{B_i}|}$ <br> $0 + 1 + 0 = 1$ | $\frac{\sum_i \frac{||\#|R_{A_i}| - \#|R_{B_i}||}{\#|R_{A_i}| + \#|R_{B_i}|}}{\max(\#R_A, \#R_B)}$ <br> $\frac{1}{\max(2, 3)} = 0.3333$ |
| A → C | $\sum_i \frac{||\#|R_{A_i}| - \#|R_{C_i}||}{\#|R_{A_i}| + \#|R_{C_i}|}$ <br> $0 + 1 + 0 = 1$ | $\frac{\sum_i \frac{||\#|R_{A_i}| - \#|R_{C_i}||}{\#|R_{A_i}| + \#|R_{C_i}|}}{\max(\#R_A, \#R_C)}$ <br> $\frac{1}{\max(2, 3)} = 0.3333$ |
| B → C | $\sum_i \frac{||\#|R_{C_i}| - \#|R_{B_i}||}{\#|R_{C_i}| + \#|R_{B_i}|}$ <br> $0 + 0 + 0 = 0$ | $\frac{\sum_i \frac{||\#|R_{C_i}| - \#|R_{B_i}||}{\#|R_{C_i}| + \#|R_{B_i}|}}{\max(\#R_C, \#R_B)}$ <br> $\frac{0}{\max(3, 3)} = 0.0000$ |

TABLE 5

Equal Length Rule Distance Metric - Method Two

| Device Pair | Calculations | Rule Count Distance Metric |
|---|---|---|
| A → B | $\sum_i \left[1 - 2\frac{\min(\#\lvert R_{A_i}\rvert, \#\lvert R_{B_i}\rvert)}{\#\lvert R_{A_i}\rvert + \#\lvert R_{B_i}\rvert}\right]$ <br> $(1 - 2\cdot\tfrac{1}{2}) + (1 - 2 * 0) + (1 - 2\cdot\tfrac{1}{2}) = 1$ | $\dfrac{\sum_i \left[1 - 2\frac{\min(\#\lvert R_{A_i}\rvert, \#\lvert R_{B_i}\rvert)}{\#\lvert R_{A_i}\rvert + \#\lvert R_{B_i}\rvert}\right]}{\max(\#R_A, \#R_B)}$ <br> $\dfrac{1}{\max(2,3)} = 0.3333$ |
| A → C | $\sum_i \left[1 - 2\frac{\min(\#\lvert R_{A_i}\rvert, \#\lvert R_{C_i}\rvert)}{\#\lvert R_{A_i}\rvert + \#\lvert R_{C_i}\rvert}\right]$ <br> $(1 - 2\cdot\tfrac{1}{2}) + (1 - 2 * 0) + (1 - 2\cdot\tfrac{1}{2}) = 1$ | $\dfrac{\sum_i \left[1 - 2\frac{\min(\#\lvert R_{A_i}\rvert, \#\lvert R_{C_i}\rvert)}{\#\lvert R_{A_i}\rvert + \#\lvert R_{C_i}\rvert}\right]}{\max(\#R_A, \#R_C)}$ <br> $\dfrac{1}{\max(2,3)} = 0.3333$ |
| B → C | $\sum_i \left[1 - 2\frac{\min(\#\lvert R_{B_i}\rvert, \#\lvert R_{C_i}\rvert)}{\#\lvert R_{B_i}\rvert + \#\lvert R_{C_i}\rvert}\right]$ <br> $(1 - 2\cdot\tfrac{1}{2}) + (1 - 2\cdot\tfrac{1}{2}) + (1 - 2\cdot\tfrac{1}{2}) = 0$ | $\dfrac{\sum_i \left[1 - 2\frac{\min(\#\lvert R_{B_i}\rvert, \#\lvert R_{C_i}\rvert)}{\#\lvert R_{B_i}\rvert + \#\lvert R_{C_i}\rvert}\right]}{\max(\#R_B, \#R_C)}$ <br> $\dfrac{0}{\max(3,3)} = 0.0000$ |

In various embodiments, turning now to the grammar distance metrics 462 based on individual (e.g., content-based) rule comparisons, a Hamming distance metric 462 may quantify the semantic similarity between the rules in the grammars 452 associated with a device pair that have an equal length, where the Hamming distance between two equal length strings refers to the number of positions at which the corresponding symbols differ (i.e., the minimum substitutions required to change one string to the other, or the minimum errors that could have transformed one string into the other). In that context, the Hamming distance metric 462 may represent the normalized Hamming distance between equal length rules in the grammars 452 associated with two different devices, which can be calculated according to the following formula, where $R_{A_i}$ denotes the text associated with rule i in the grammar 452 associated with Device A, $\lvert R_{A_i}\rvert$ denotes the length associated with rule i in the grammar 452 associated with Device A, and the Hamming distance metric 462 requires $R_{A_i}$ and $R_{B_j}$ to have the same length:

$$D \propto \frac{\sum_i^{\max(\lvert R_A\rvert)} \sum_j^{\max(\lvert R_B\rvert)} \frac{\text{Min}\left(\text{Hamming}\left(\sum_k R_{A_{ik}}, \sum_l R_{B_{jl}}\right)\right)}{\lvert R_{A_i}\rvert}}{\min(\#R_A, \#R_B)}$$

More particularly, to compute the Hamming distance metric 462 between two rule strings having an equal length, a non-binary exclusive OR (XOR) comparison may be performed between the two symbols at each position within the respective rule strings, wherein a match yields a zero (0) and a mismatch yields a one (1) (e.g., if the first character in each rule string are the same, the XOR comparison between the respective first characters yields a zero value, whereas the XOR comparison between the first characters yields a one value if the first characters in the respective rule strings are different). As such, in various embodiments, the values from the non-binary XOR comparisons that are performed between the symbols at each position in the two equal-length rule strings may be summed and the summed total may then be divided according to the total length associated with the compared rule strings to compute the total Hamming distance between the equal-length rule strings. Furthermore, to compute the overall Hamming distance metric 462 between the grammars associated with a device pair, the total Hamming distances between all equal-length rule strings associated with each device may be summed and then divided according to the minimum number of (flattened) rule strings in the grammars associated with either device. For example, in context with the various rule strings in the grammars 452 associated with Device A, Device B, and Device C mentioned above, the Hamming distance metric 462 associated with each device pair may be calculated as follows:

TABLE 6

Hamming Distance Metric - Initial Calculations

| Device Pair | (X → Y)$_i$ | Hamming | Length | Distance |
|---|---|---|---|---|
| A → B | (A → B)$_2$ | Hamm(ad, ba) = 2 | 2 | 1 |
|  | (A → B)$_4$ | Hamm(adcd, dcda) = 4 | 4 | 1 |
| A → C | (A → C)$_2$ | Hamm(ad, ab) = 1 | 2 | 0.5 |
|  | (A → C)$_4$ | Hamm(adcd, adcd) = 0 | 4 | 0 |
| B → C | (B → C)$_2$ | Hamm(ba, ab) = 2 | 2 | 1 |
|  | (B → C)$_3$ | Hamm(dcd, adc) = 3 | 3 | 1 |
|  | (B → C)$_4$ | Hamm(dcda, adcd) = 4 | 4 | 1 |

TABLE 7

Hamming Distance Metric Between Equal Length Rules

| Device Pair | (X → Y)$_2$ | (X → Y)$_3$ | (X → Y)$_4$ | min (#X, #Y) | Hamming Distance |
|---|---|---|---|---|---|
| A → B | 1 | N/A | 1 | min(2, 3) | 1.000 |
| A → C | 0.5 | N/A | 0 | min(2, 3) | 0.250 |
| B → C | 1 | 1 | 1 | min(3, 3) | 1.000 |

In various embodiments, another grammar distance metric 462 that can quantify the semantic similarity between individual rules in the grammars 452 associated with a device pair may comprise a Levenshtein distance metric, where the Levenshtein distance generally measures the difference between two strings with respect to the minimum number of single-character edits (i.e., insertions, deletions, or substitutions) required to change one string to the other. In that context, the Levenshtein distance metric 462 can be calculated according to the following formula, subject to algorithmic constraints where the rule pair having a minimum rule length difference is chosen and no rule is used more than once:

$$D \propto \frac{\sum_{i}^{\#R_A} \sum_{j}^{\#R_B} \frac{\text{Min}(\text{Levenshtein}(R_{A_i}, R_{B_j}))}{\text{Max}(|R_{A_i}|, |R_{B_j}|)}}{\min(\#R_A, \#R_B)}$$

Accordingly, given the various rule strings in the grammars 452 associated with Device A, Device B, and Device C, the Hamming distance metric 462 associated with each device pair may be calculated as follows:

$A_2$: a d # substitute a with b; substitute d with a
$A_2$: b a
$B_2$: b a
    two substitutions;
    Levenshtein distance=2
    rule length difference=0
$A_2$: a d # insert d prior to a
$A_2$: d a d # substitute a with c
$A_2$: d c d
$B_3$: d c d
    one insertion; one substitution
    Levenshtein distance=2
    rule length difference=1
$A_2$: a d # insert d prior to a
$A_2$: d a d # substitute a with c
$A_2$: d c d # insert a after d
$A_2$: d c d a
$B_3$: d c d a
    two insertions; one substitution
    Levenshtein distance=3
    rule length difference=2
among the three rules in Device B grammar, B2 is closest to A2;
lowest Levenshtein distance=2
lowest rule length difference=0

$\text{Max}(|R_{A_2}|, |R_{B_2}|) = \max(2,2) = 2$ normalized Levenshtein distance for this rule pair=2/2=1

Accordingly, because rule $B_2$ has already been matched to rule $A_2$, rule $B_2$ can no longer be used to match to other rules in the grammar 452 associated with Device A. In various embodiments, the above insertion/substitution/deletion procedure may be repeated until an appropriate rule pair has been determined with respect to each rule in the grammar 452 associated with Device A and the normalized Levenshtein distance has been calculated for each rule pair. The total Levenshtein distance can then be calculated as follows and the Levenshtein distance for each device pair is then shown in the following table:

$A_2 \rightarrow B_2$ Levenshtein distance=1
$A_4 \rightarrow B_3$ Levenshtein distance=¼
min ($\#R_A$, $\#R_B$)=min(2,3)=2
(1+¼)/2=5/8=0.6250

TABLE 8

Levenshtein Distance Between Rules

| Device Pair | Levenshtein Distance |
|---|---|
| A → B | 0.6250 |
| A → C | 0.2500 |
| B → C | 0.6667 |

In various embodiments, each distance metric 462 calculated with respect to a particular device pair may then be summed to obtain a net distance between the grammars 452 associated with the respective devices, which may be normalized according to how many distance metrics 462 were used. Furthermore, in certain use cases, one or more distance metrics 462 may be deemed more significant than others, in which case the more important distance metrics 462 may be assigned higher weights. However, in the example calculations provided below showing the net grammar distances 462 between the grammars 452 associated with Device A and Device B ($D_{A \rightarrow B}$), the grammars 452 associated with Device A and Device C ($D_{A \rightarrow C}$), and the grammars 452 associated with Device B and Device C ($D_{B \rightarrow C}$) each distance metric 462 has been assigned equal weight.

TABLE 9

Net Grammar Distance

| Distance Metric | $D_{A \rightarrow B}$ | $D_{A \rightarrow C}$ | $D_{B \rightarrow C}$ |
|---|---|---|---|
| Rule Count | 0.2000 | 0.2000 | 0.0000 |
| Average Rule Length | 0.0000 | 0.0000 | 0.0000 |
| Equal Length Rule Count | 0.3333 | 0.3333 | 0.0000 |
| Hamming Distance | 1.000 | 0.2500 | 1.0000 |
| Levenshtein Distance | 0.6250 | 0.2500 | 0.6667 |
| Net Grammar Distance | 0.4317 | 0.2067 | 0.3333 |

Figure 5:
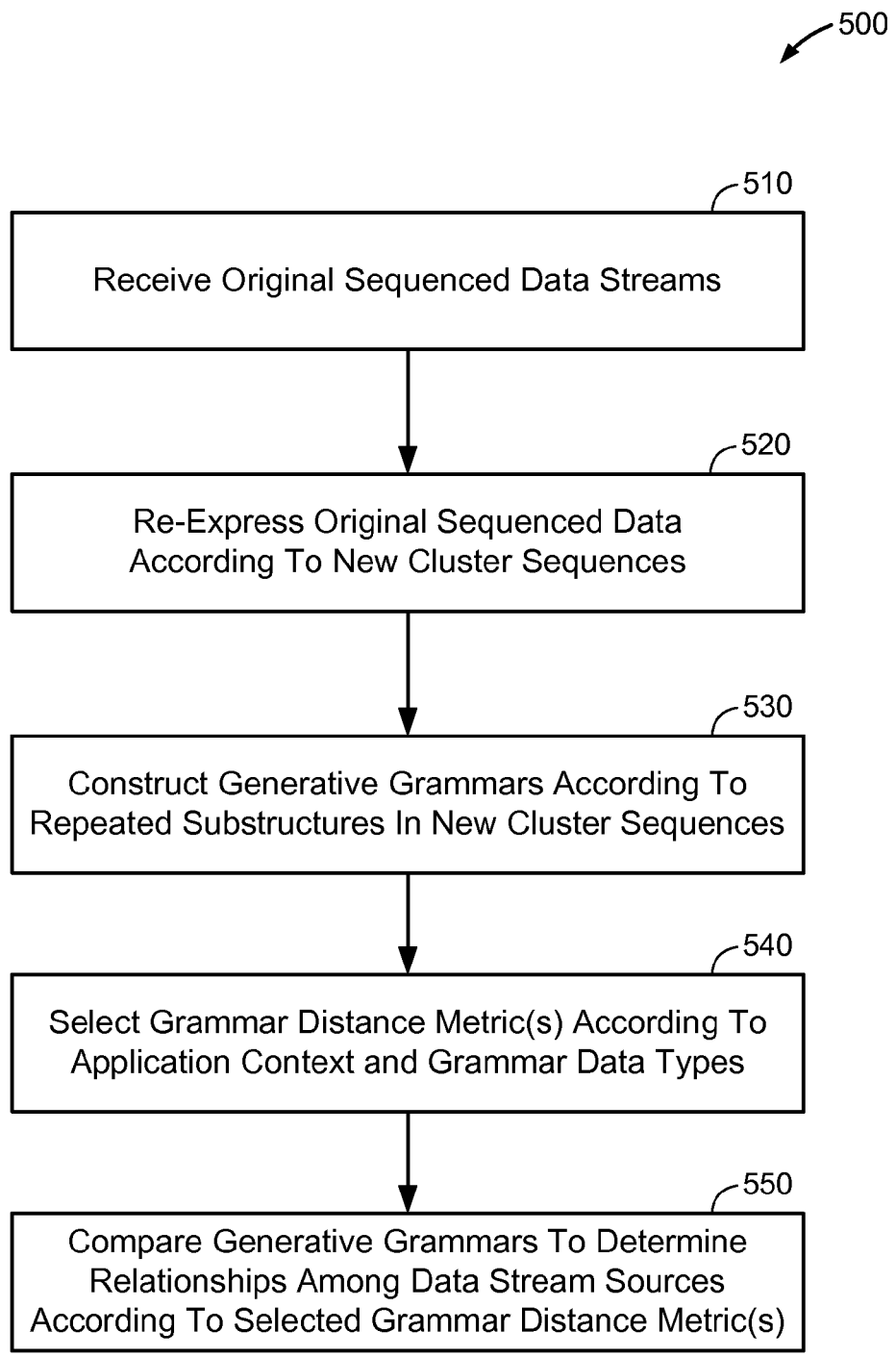
FIG. 5 illustrates an exemplary method in which original sequenced data streams may be re-expressed according to sequenced clusters from which grammars can be constructed and compared to quantify similarities or otherwise analyze relationships among the sources associated with the sequenced data streams, according to various aspects.

According to various aspects, FIG. 5 illustrates an exemplary method 500 in which sequenced data streams may be used to construct grammars that can then be analyzed to determine relationships among the sources associated with the data streams based on syntactic and semantic similarities between the grammars. More particularly, at block 510, a behavioral analysis system may initially receive the original sequenced data streams and then re-express the sequenced data items contained therein according to a new cluster sequence at block 520. For example, in various embodiments, re-expressing the original sequenced data items at block 520 may comprise placing each sequenced data item contained in the original data streams into a cluster. The clusters into which the sequenced data items were placed may then be arranged in a sequence to produce the new cluster sequences and a terminal symbol may be assigned to each unique cluster in the new cluster sequence. In various embodiments, at block 530, generative grammars may then be constructed to correspond to the original sequenced data streams, wherein the generative grammars may represent one or more patterns, structures, sub-patterns, sub-structures, etc. that repeat in the symbol sequence used to re-express the original sequenced data items according to the clusters or centroids associated therewith. As such, the generative grammars constructed at block 530 may have one or more rules to represent the repeating patterns, structures, sub-patterns, sub-structures, etc. among the symbols in the new cluster sequences, and the generative grammars may optionally further comprise one or more hierarchical and/or nested rules that reference other rules (if applicable) and are flattened such that only terminal symbols remain (except that the zeroth rule representing the original symbol sequence may remain unflattened).

Accordingly, in various embodiments, one or more grammar distance metrics may then be selected at block 540 to quantify similarities between the generative grammars, wherein the particular grammar distance metrics may be selected according to an application context and data types associated with the grammars. For example, in various embodiments, the distance metrics selected at block 540 may quantify syntactic similarities and/or semantic similarities between disparate original data streams, where the selected distance metrics may be tailored according to the particular application context and data types used to form the generative grammars (e.g., whether the application context places greater importance on syntactic form or semantic meaning, places relatively equal importance on both syntactic form or semantic meaning, etc.). In general, the distance metrics can be assumed to be commutative or symmetric, meaning that a distance from a first grammar to a second grammar will be the same as the distance from the second grammar to the first grammar. Furthermore, each distance metric selected at block 540 may be a normalized $L_1$ norm, which may generally refer to a geometric metric in which the distance between two points is the sum of the absolute differences between the Cartesian coordinates associated therewith (e.g., a Taxicab norm or Manhattan distance). Accordingly, each distance metric may range from zero to one and multiple distance metrics may be averaged to determine the total net distance between any two grammars.

In various embodiments, the generative grammars associated with a certain device pair, user pair, or other suitable pair may then be compared at block 550 to determine a semantic and/or syntactic relationship therebetween according to the selected distance metric(s). More particularly, as described in further detail above, the grammar distance metrics may be based on aggregate (e.g., global) rule comparisons that can be used to quantify similarities in syntactic form and individual (e.g., content-based) rule comparisons that can quantify similarities in semantic meaning. For example, in various embodiments, the grammar distance metrics that are used to compare the generative grammars at block 550 and thereby quantify the syntactic similarity between the grammars may include a rule count distance metric that compares the total rule count in each grammar. In another example, the syntactic similarity between the grammars can be calculated according to an average rule length distance metric that compares the average rule length in the grammars associated with each device in the pair. In still another example, the syntactic similarity between the grammars can be calculated according to an equal length rule count distance metric based on the number of rules in each grammar that have an equal length. In that sense, the equal length rule count distance metric may differ from the rule count distance metric and the average rule length distance metric in that the equal length rule count metric compares aggregate counts between individual rules, which may quantify a lower-level syntactic similarity between the grammars.

Furthermore, in various embodiments, the grammar distance metrics that are used to compare the generative grammars at block 550 and thereby quantify the semantic similarity between the grammars may include a Hamming distance metric, which may generally represent the normalized Hamming distance between equal length rules in the compared grammars. More particularly, to compute the Hamming distance metric and thereby quantify the semantic similarity between two rule strings that have an equal length, a non-binary XOR comparison may be performed between the symbols at each position within the respective rule strings, wherein a match yields a zero (0) and a mismatch yields a one (1). Accordingly, the Hamming distance metric may generally represent the number of positions at which corresponding symbols in the respective equal length rule strings differ from one another, or stated differently, the minimum substitutions needed to change one string to the other or the minimum errors that could have transformed one string into the other. Furthermore, in another example, the semantic similarity between individual rules in the compared grammars may be quantified according to a Levenshtein distance metric, which may generally measure the difference between two strings with respect to the minimum number of single-character edits (i.e., insertions, deletions, or substitutions) required to change one string to the other. For example, calculating the Levenshtein distance metric may comprise identifying a rule pair having a minimum difference in length and determining the minimum number of single-character edits needed to transform one rule into another (subject to a constraint that no rule is used more than once).

In various embodiments, the distance metrics used to compare the generative grammars at block 550 may then be summed to obtain a net distance between the grammars associated with the respective devices, which may be normalized according to how many distance metrics were used. Furthermore, in certain use cases, one or more distance metrics may optionally be deemed more significant than others, in which case the more important distance metrics may be assigned higher weights. In any case, the normalized net distance may then be used to determine a relationship among the respective sources associated with the original data streams (e.g., whether devices, users, etc. associated with the original sequenced data streams are semantically similar, syntactically similar, semantic and syntactically similar, etc.).

Figure 6:
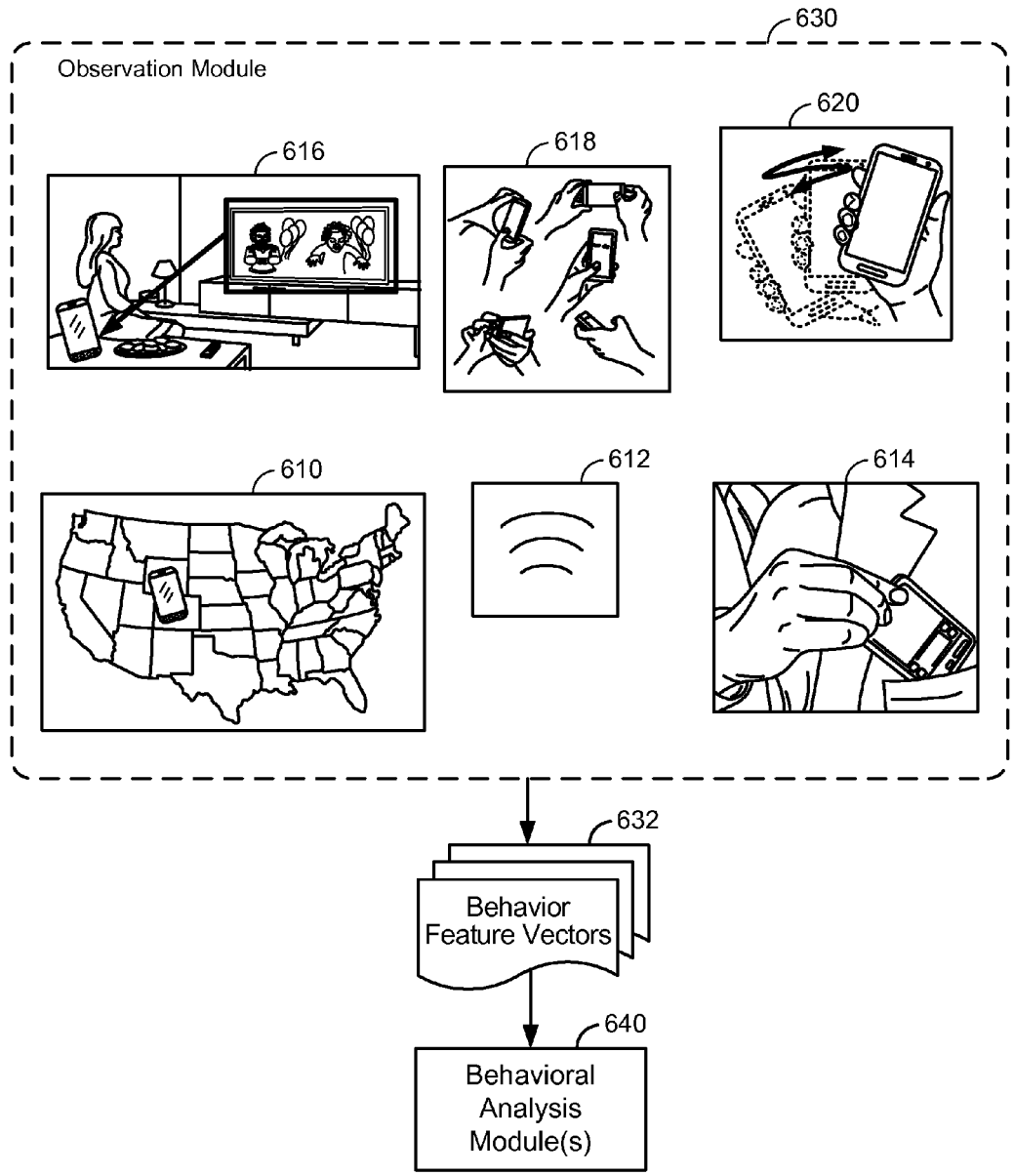
FIG. 6 illustrates exemplary behaviors that can be monitored on an electronic device to generate a profile model associated with an authorized user, according to various aspects.

According to various aspects, FIG. 6 illustrates exemplary behaviors that can be monitored on an electronic device to generate a profile model associated with an authorized user, wherein the clustering algorithms and distance metrics described in further detail above may be used to generate the profile model and determine whether a current operator using the electronic device is the authorized user or some other user (e.g., a potential thief who physically stole the electronic device and is now using the device, a malicious user who has obtained unlock or other authentication credentials and is improperly using the electronic device, an authorized secondary user such as the authorized user's spouse or child, etc.). More particularly, whereas current approaches to detecting unauthorized usage tend to naïvely measure one or more particular attributes (e.g., a time from device pick-up as sensed with an accelerometer to the time that the user first touches the device) and then establish a threshold with respect to the measured attributes to characterize the user, which can result in thresholds that are either excessively sensitive or excessively lax, the clustering algorithms and distance metrics described in further detail above may be used in a substantially continuous authentication approach based on substantially continuous behavior analysis associated with the electronic device operator.

In various embodiments, the electronic device may comprise an observation module 630 configured to capture one or more behavior feature vectors 632 that represent salient behaviors observed on the electronic device. Accordingly, the techniques described herein to detect device theft and unauthorized device usage may generally assume that the electronic devices implementing such techniques have capabilities to observe at least some local behaviors. For example, as shown in FIG. 6, the behaviors that are observed via the observation module 630 may be based on a location profile 610 (e.g., position fixes acquired via a GPS receiver, Wi-Fi signals, etc.), ambient sound signatures 612 (e.g., sound signals captured via a microphone), and user-specific motions distinct from general motions that can be attributed to any user rather than a specific operator (e.g., a motion 614 to pull the device from a pocket, a specific device motion 620 that occurs while walking, etc., which may be detected with an accelerometer, gyroscope, or other suitable motion sensor on the electronic device). Furthermore, additional example behaviors that the observation module 630 may observe may comprise information based on an events and notification profile 616 (e.g., push notifications received at the electronic device), actions 618 that may include, without limitation, unlocking the device, entering data into the device, answering a call, etc., keystroke-based identity profiles (e.g., positions, timings, and patterns with respect to the keystrokes that a certain operator makes to enter input into the device), application installation and usage frequencies, and so on. Accordingly, those skilled in the art will appreciate that the observation module 630 may broadly capture the behavior feature vectors 632 to represent any suitable salient behaviors that can be observed on the electronic device and attributed to a certain operator.

In various embodiments, the behavior vectors 632 generated at the observation module 630 may then be provided to one or more behavioral analysis modules, which may execute one or more machine learning algorithms to cluster the behavior vectors 632 locally and thereby construct a local user profile model. More particularly, the one or more behavioral analysis modules 640 may re-express the original behavior feature vectors 632 according to various centroids and derive a grammar from the original behavior feature vectors 632 that are re-expressed according to the corresponding centroids. For example, in FIG. 6, the behaviors represented in the behavior feature vectors 632 include behavior [A] to represent observed behavior 610, behavior [B] to represent observed behavior 612, behavior [C] to represent observed behavior 614, behavior [D] to represent observed behavior 616, behavior [E] to represent observed behavior 618, and behavior [F] to represent observed behavior 620, resulting in the overall behavior sequence [A] [E] [D] [C] [F] [B] [A] [E] [D] [C] [F] [B]. Accordingly, using the Sequitur algorithm, the one or more behavioral analysis modules 640 may re-express the interaction sequence [A] [E] [D] [C] [F] [B] [A] [E] [D] [C] [F] [B] according to a grammar in which the symbol sequence 672 comprises S→3 3 to represent one or more repeated patterns (or rules) 674, where "1" indicates a non-terminal symbol that can replace terminal symbol sequence [A] [E] [D] in the symbol sequence 672, "2" indicates a non-terminal symbol that can replace terminal symbol sequence [C] [F] [B] in the symbol sequence 672, and "3" indicates a non-terminal symbol that can replace non-terminal symbol pair [1] [2] in the symbol sequence 672 (i.e., terminal symbol sequence [A] [E] [D] [C] [F] [B]).

In various embodiments, the one or more behavioral analysis modules 640 can then transmit the local profile model to a security server (not shown), wherein the local profile model may generally include the data grammar derived from the original behavior feature vectors 632 and the corresponding centroids into which the original behavior feature vectors 632 were clustered. In various embodiments, the security server may then cluster the local profile module transmitted thereto with profile models received from devices associated with various other users and group the various users into a small number of "baseline" clustered models. The electronic device may then download the baseline clustered models from the security server, and the one or more behavioral analysis modules 640 may generate new profile models from behavior feature vectors 632 that are generated at the observation module 630 and compare the new profile models to the downloaded baseline clustered models to ensure that the local profile model matches the profile model on the security server. For example, in various embodiments, the one or more behavioral analysis modules 640 may compare the new profile models to the downloaded baseline clustered models according to the grammar distance metrics described above (e.g., a rule count distance metric, an average rule length distance metric, and/or an equal length rule count distance metric that may quantify syntactic similarities between the profile models, a Hamming distance metric and/or a Levenshtein distance metric that may quantify semantic similarities between the profile models, etc.). In various embodiments, in the event that the grammar distance metrics indicate that the local profile model matches the profile model on the security server (e.g., where a net distance metric is below a certain threshold), the user identity may be verified according to an appropriate confidence level (e.g., depending on the value associated with the grammar distance metric(s)). However, in the event that the grammar distance metrics indicate that the local profile model does not match the profile model on the security server (e.g., where the net distance metric is above the threshold), an operator change may be detected and appropriate actions may be taken in response thereto. For example, possible actions may include comparing the local profile model to profile models associated with one or more authorized users (e.g., a spouse or child associated with the primary user), in which case an operator change notification may be generated to that effect. Alternatively, where the local profile model does not match the profile models associated with any authorized users (or where there are no authorized secondary users), recovery and/or protective actions may be initiated (e.g., broadcasting a location associated with the electronic device to assist with recovery, protecting data and shutting down to prevent a thief from using the electronic device, etc.).

As such, because the profile models used to authenticate the device operator are based on aggregate behaviors observed over time, which include behaviors associated with other users that are observed over time and used to build the baseline profile models compared to the local profile model, the resulting comparison thresholds are more realistic and accurate than thresholds that are established according to individual features. Furthermore, because the baseline profile models are created from aggregate behaviors that various users engage in over time, the baseline profile models may provide an external perspective on the local user profile model and therefore yields robust thresholds.

Figure 7:
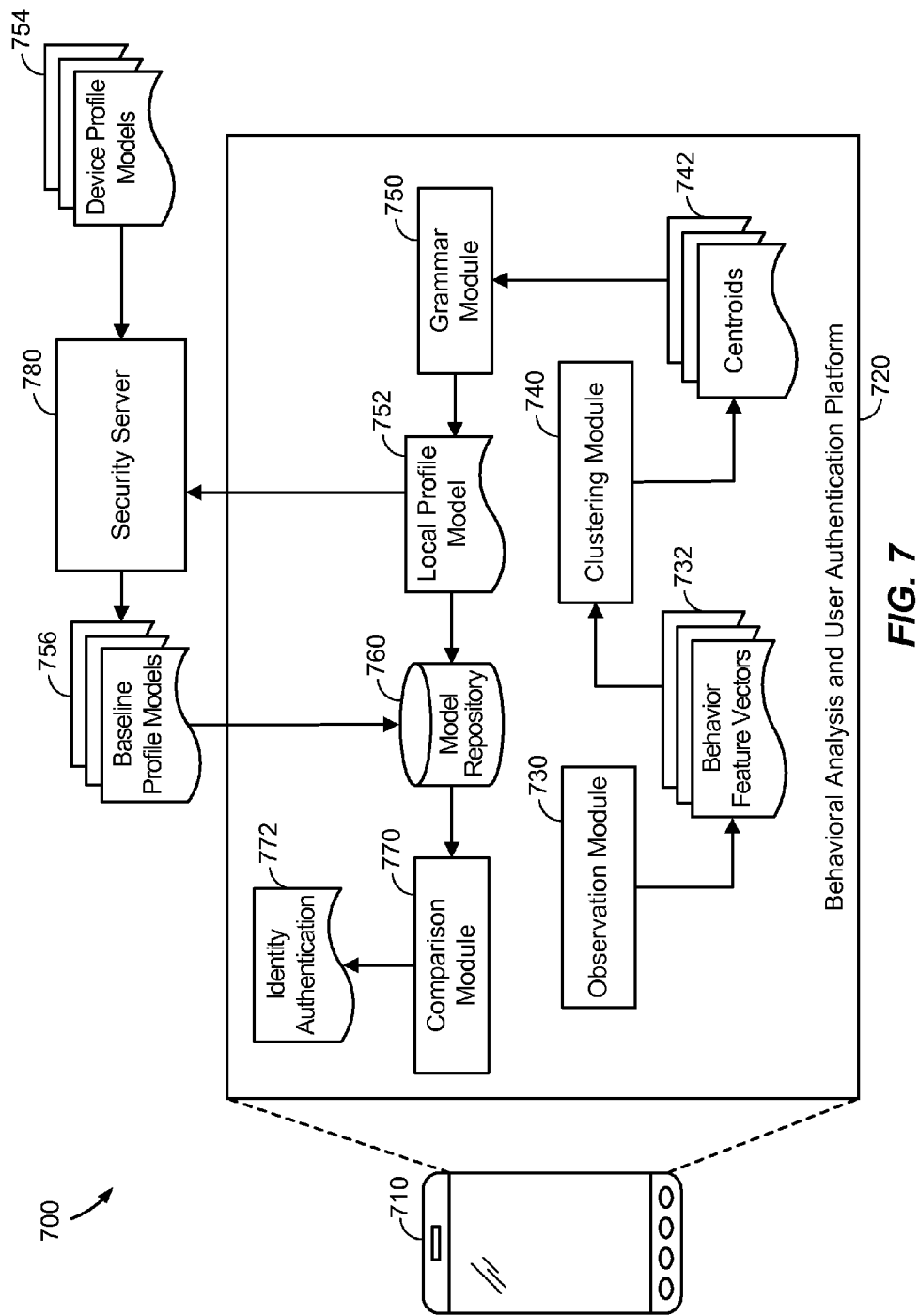
FIG. 7 illustrates an exemplary environment in which an electronic device may compare a profile model generated on the device with baseline profile devices downloaded from a server to detect device theft or unauthorized usage, according to various aspects.

According to various aspects, FIG. 7 illustrates an exemplary environment 700 in which an electronic device 710 may compare a local profile model 752 generated on the device 710 with baseline profile devices 756 downloaded from a security server 780 to detect device theft or unauthorized usage. Those skilled in the art will appreciate that although the electronic device 710 has the appearance of a smartphone in FIG. 7, the electronic device 710 shown therein may comprise any suitable device that can observe at least some salient local behaviors that can be attributed to specific users or operators and conduct behavioral analysis that involves comparing the local profile model 752 generated on the device 710 with the baseline profile devices 756 downloaded from the security server 780 as described in further detail herein.

As such, in various embodiments, the electronic device 710 may comprise an on-device behavioral analysis and user authentication platform 710 that includes at least an observation module 630, a clustering module 740, a grammar module 750, a model repository 760, and a comparison module 770. More particularly, the electronic device 710 may generally comprise one or more sensors, measurement hardware, or other suitable components through which the observation module 730 can monitor behaviors that occur in a local environment associated therewith (e.g., an accelerometer that can measure acceleration and tilt that indicates certain user-specific motions such as pulling the device 710 from a pocket, motion while walking, etc., a temperature sensor that can measure internal and/or ambient temperatures, a photosensor that can detect light, an antenna that can monitor local wireless signals, a GPS receiver that can acquire a position fix, a microphone that can capture ambient sound signatures, a touchscreen, keypad, or other input device that can be used to unlock the device 710, enter data into the device 710, etc. according to user-specific positions, timings, and patterns, instrumentation that can detect processor activity, network activity, etc.). Accordingly, in various embodiments, the observation module 630 may be configured to monitor or otherwise collect local behavioral information on the electronic device 710 through one or more application program interface (API) calls and minimal instrumentation at one or multiple levels in an operating system stack, whereby the observation module 730 may utilize fast and efficient in-memory processing to monitor, measure, or otherwise observe behavioral information associated with the electronic device 710 and generate one or more behavior feature vectors 732 that describe the observed behaviors in concise terms. For example, during an initialization or "training" phase, the observation module 730 may monitor behavior on the device 710 over a predefined time period comprising L (e.g., seven) days, wherein the behavior observed over the L day time period may be mapped into a d-dimensional space. As such, the observation module may extract the behavior vectors 732 that represent the observed behaviors over the L day time period, wherein the extracted behavior vectors 732 each have a size d and where each behavior vector 732 represents one behavior type (e.g., notifications, location updates, etc.) and each entry in the behavior vectors 732 represents one observed behavior having the respective type.

In various embodiments, the behavior feature vectors 732 may then be input to the clustering module 740, which may create K (e.g., twenty) centroids 742 from the behavior feature vectors 732, wherein the K centroids 742 may indicate a temporal user context based on the behaviors that the user performed over the L day time period during which the behaviors were observed. In various embodiments, the K centroids 742 may then be provided to a grammar module 750, which may arrange the K centroids 742 into a sequence, assign a terminal symbol to each unique centroid 742, and identify one or more repeating patterns, structures, sub-patterns, sub-structures, etc. in the symbol sequence representing the sequenced centroid 742. In various embodiments, the grammar module 750 may then create one or more rules to represent the repeating patterns, structures, sub-patterns, sub-structures, etc. identified in the symbol sequence, create one or more hierarchical and/or nested rules that reference other rules (if applicable), and flatten each rule such that only terminal symbols remain, except that the zeroth rule that represents the original symbol sequence is not flattened. The grammar module 750 may then create an initial local profile model 752, which may comprise the K centroids 742 and the data grammar derived from the original features that were represented in the behavior feature vectors 732 and re-expressed according to the K centroids 742 respectively corresponding thereto (i.e., the derived data grammar may comprise a symbol sequence that represents a temporal context associated with the K centroids 742 according to one or more rules that represent repeating patterns, structures, sub-patterns, sub-structures, etc. therein).

In various embodiments, the electronic device 710 may then store the local profile model 752 in a local model repository 760. In addition, the electronic device 710 may upload the local profile model 752 to the security server 780, which may further receive profile models 754 uploaded from various other devices. The security server 780 may then execute a clustering algorithm on the local profile model 752 uploaded from the electronic device 710 in combination with the profile models 754 uploaded from the various other devices to create K baseline profile models 756. Furthermore, the security server 780 may compare the local profile model 752 uploaded from the electronic device 710 (and the profile models 754 uploaded from the various other devices) to the K baseline profile models 756 to determine the baseline profile model 756 closest to each respective profile model 752, 754 that was uploaded to and clustered on the security server 780 to form the K baseline profile models 756. For example, in various embodiments, the security server 780 may compare the local profile models 752, 754 uploaded thereto with each baseline profile model 756 to calculate one or more distance metrics that quantify a semantic and/or syntactic similarity between the local profile models 752, 754 and each respective baseline profile model 756. Accordingly, the security server 780 may register each local profile model 752, 754 as a member within the particular baseline profile model 756 closest to the respective local profile model 752, 754, as determined according to the grammar distance metrics (e.g., distance metrics based on aggregate or global rule comparisons that can quantify similarities in syntactic form and individual or content-based rule comparisons that can quantify similarities in semantic meaning). Accordingly, depending on the particular distance metric(s) used, the security server 780 may identify one baseline profile model 756 closest to each respective local profile model 752, 754 such that each local profile model 752, 754 may be a member in the closest baseline profile model 756. Furthermore, in various embodiments, the security server 780 may track the membership in the baseline profile models 756 over time to create and maintain anonymous user behavior profiles (not shown).

In various embodiments, the electronic device 710 (and the devices associated with profile models 754) may then download the baseline profile models 756 from the security server 780 and store the downloaded baseline profile models 756 in the model repository 760 together with the initial local profile model 752. Furthermore, the electronic device 710 may store information in the model repository 760 to indicate the current baseline profile model 756 in which the local profile model 752 was assigned membership. As such, the initial local profile model 752 generated on the device 710, the baseline profile models 756 downloaded from the security server 780, and the information in the model repository 760 indicating the current membership associated with the local profile model 752 can be used to authenticate a current user or operator associated with the electronic device 710 and thereby detect potential theft, unauthorized usage, authorized operator changes, etc. More particularly, the observation module 730 may continue to monitor user behavior on the electronic device 710 in a substantially continuous and similar manner to that described above. However, whereas the observation module 730 monitored the user behavior over an L day period during the initialization or "training" phase used to create the initial local profile model 752 and the baseline profile models 756, the observation module 730 may monitor the user behavior on the device 710 over smaller time periods M (e.g., five minutes) during subsequent phases that are directed to user authentication, identity verification, theft detection, operator change detection, etc. Accordingly, the clustering module 740 and the grammar module 750 may perform similar functions to those described above to rebuild a new local profile model 752 over the time periods M.

In various embodiments, the comparison module 770 may then compare the new local profile models 752 that are rebuilt over the time periods M to each baseline profile model 756 downloaded from the security server 780. For example, in various embodiments, the comparison module 770 may compare the new local profile models 752 to the downloaded baseline profile models 756 according to the various grammar distance metrics described in further detail above with respect to FIG. 4 and FIG. 5. As such, the comparison module 770 may determine a net/normalized distance from the local profile model 752 to each baseline profile model 756 to quantify syntactic and/or semantic similarities therebetween and identify the baseline profile model 756 closest to the local profile model 752 accordingly. In various embodiments, the comparison module 770 may then generate an identity authentication 772 based on whether the comparison module 770 was able to verify that the current user (or operator) associated with the electronic device 710 is the prior user who engaged in the behavior during the training phase that resulted in the initial local profile model 752. For example, if the current user or operator is the prior (authorized) user, the new profile model 752 from the most recent observation period should still be closest to the baseline profile model 756 that includes the initial local profile model 752 as a member. Accordingly, in response to determining that the (current) new profile model 752 is closest to the baseline profile model 756 that includes the initial local profile model 752 as a member, the identity authentication 772 that the comparison module 770 generates may authenticate the current user identity with a confidence X, which may be expressed according to a percentage depending on the distance from the current profile model 752 and the baseline profile model 756 closest to the original local profile model 752. For example, in various embodiments, the confidence measure X may be inversely proportional to a difference between the distance between the current profile model 752 and the closest baseline profile model 756 and the distance between the original profile model 752 and the closest baseline profile model 756 (e.g., because the distance metrics range from zero to one, where a zero value indicates the least possible distance and a one value indicates the highest possible distance).

However, in response to determining that the current profile model 752 is closest to a different baseline profile model 756 than the original local profile model 752, the identity authentication 772 may indicate a change in operator from the original local profile model 752, which may cause one or more actions to occur on the electronic device 710. For example, possible actions may include having the comparison module 770 compare the current local profile model 752 to local profile models 752 that are associated with one or more authorized users (e.g., a spouse or child associated with the primary user), which assumes that sufficient "training" behavior was observed with respect to the other authorized users to create local profile models 752 associated therewith. Accordingly, in response to the comparison module 770 determining that the current local profile model 752 matches the local profile model 752 associated with another authorized user, the identity authentication 772 may comprise an operator change notification to that effect. Alternatively, where the current local profile model 752 does not match the local profile models 752 associated with any authorized users to a sufficient confidence level (or where there are no authorized secondary users that engaged in sufficient training behavior), the identity authentication 772 may comprise a message communicated internally within the electronic device 710 and/or to the external security server 780 to initiate recovery and/or protective actions. For example, the identity authentication 772 may cause an internal transmitter on the device 710 to broadcast a current or most recent position fix to thereby assist in finding or otherwise recovering the device 710. In another example, the identity authentication 772 may start an internal procedure to protect data stored on the device 710 and shut the device 710 down to prevent the unauthorized operator from continuing to use the electronic device 710. However, those skilled in the art will appreciate that the recovery and/or protective actions mentioned above are merely exemplary, and that any suitable recovery and/or protective actions that may occur once the device 710 is suspected to be lost or stolen can be employed in addition to and/or rather than those mentioned.

Accordingly, because the environment 700 shown in FIG. 7 supports procedures to authenticate a current user or operator associated with the electronic device 710 using profile models 752, 754, 756 that are based on behaviors observed over time, including behaviors associated with other users that provide an external perspective on the local user profile model 752, the model generation and comparison techniques described herein can enable more robust and realistic identity thresholds that may be possible through raw comparisons between discrete individual features.

Figure 8:
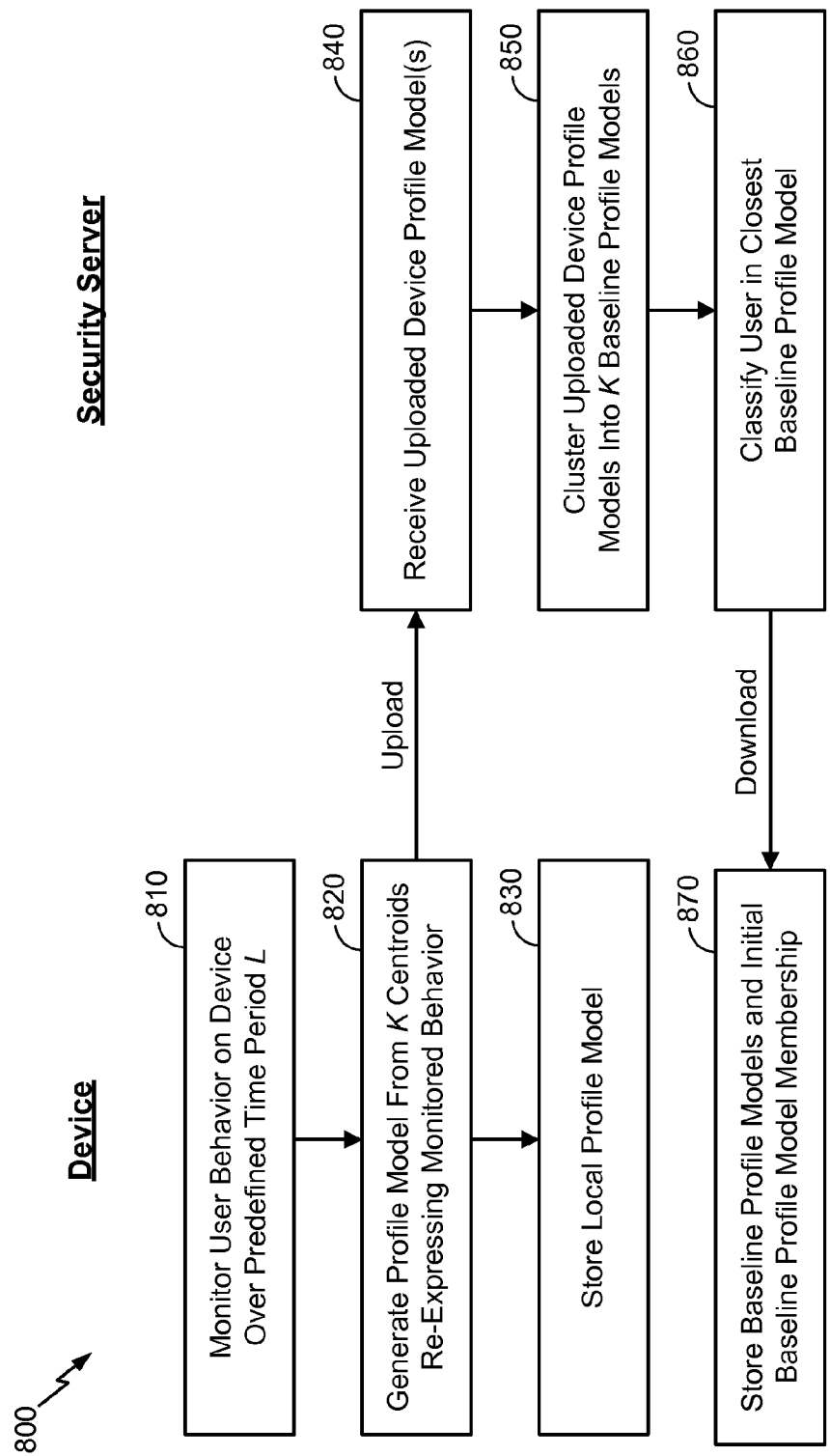
FIG. 8 illustrates an exemplary method in which an electronic device and a server may establish baseline profile models that can be used to detect electronic device theft or unauthorized usage, according to various aspects.

According to various aspects, FIG. 8 illustrates an exemplary method 800 in which an electronic device and a server may establish baseline profile models that can be used to detect electronic device theft or unauthorized usage. More particularly, in various embodiments, the electronic device may comprise an on-device behavioral analysis and user authentication platform that comprises one or more sensors, measurement hardware, or other suitable components through which behaviors that occur in a local environment associated therewith. Accordingly, at block 810, the electronic device may monitor or otherwise collect local behavioral information on the electronic device over a predefined time period L (e.g., seven days), wherein the behavior observed over the time period L may be represented in various behavior vectors. In various embodiments, at block 820, the behavior vectors may be analyzed according to a clustering algorithm that re-expresses the monitored behavior according to K centroids that indicate a temporal user context based on the user-specific behaviors that were monitored over the initial observation period L. In various embodiments, a profile model may then be generated from the K centroids, wherein the profile model generated at block 820 may comprise the K centroids and a data grammar derived from the behaviors re-expressed according to the corresponding K centroids (i.e., the data grammar derived from the K centroids may comprise a symbol sequence that represents the K centroids according to a temporal context and according to one or more rules that represent repeating patterns, structures, sub-patterns, sub-structures, etc. in the symbol sequence).

In various embodiments, at block 830, the electronic device may store the local profile model in a local repository. In addition, the electronic device may upload the local profile model to a security server, which may receive the uploaded profile model and profile models uploaded from various other devices at block 840. In various embodiments, at block 850, the security server may execute a clustering algorithm on the local profile models uploaded from the electronic device and the various other devices to create K baseline profile models. Furthermore, at block 860, the security server may compare the local profile model uploaded from the electronic device (and the profile models uploaded from the various other devices) to the K baseline profile models to determine the baseline profile model closest to each respective profile model that was uploaded to the security server and used in the clustering algorithm to form the K baseline profile models. Accordingly, at block 860, the security server may classify each local profile model as a member within the baseline profile model closest to the respective local profile model, as determined according to one or more grammar distance metrics (e.g., distance metrics based on aggregate or global rule comparisons that can quantify similarities in syntactic form and individual or content-based rule comparisons that can quantify similarities in semantic meaning). Furthermore, the electronic device (and the devices associated with the other profile models received at the security server in block 840) may then download the K baseline profile models from the security server, which may be stored locally at block 870 together with information to indicate the current baseline profile model in which the security server classified the local profile model as a member. As such, the initial local profile model generated at block 820, the baseline profile models generated on the security server at block 850 and downloaded therefrom at block 870, and the stored information indicating the current membership associated with the local profile model can be used to authenticate a current user or operator associated with the electronic device and thereby detect potential theft, unauthorized usage, authorized operator changes, etc.

Figure 9:
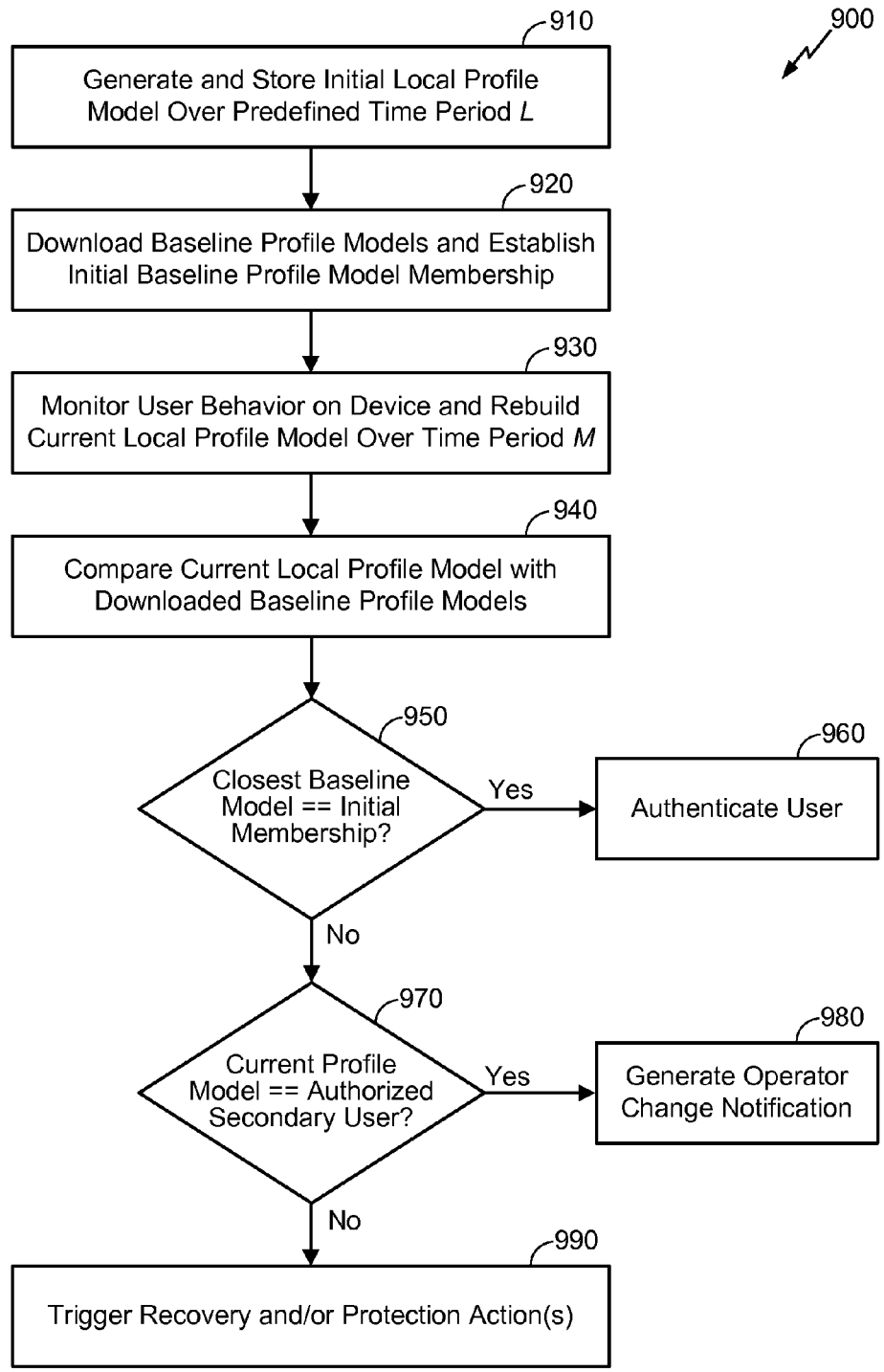
FIG. 9 illustrates an exemplary method in which an electronic device may compare behavior monitored thereon to one or more baseline profile models to detect electronic device theft or unauthorized usage, according to various aspects.

According to various aspects, FIG. 9 illustrates an exemplary method 900 in which an electronic device may compare behavior monitored thereon to one or more baseline profile models to detect electronic device theft or unauthorized usage. More particularly, at block 910, the electronic device may generate and store an initial local profile model that represents user-specific behavior observed during an initialization or "training" phase that occurs over a predefined time period L. In various embodiments, the electronic device 910 may then upload the initial local profile model to a security server, which may receive the initial profile model uploaded from the device in addition to profile models uploaded from various other devices. The security server may then places the various profile models into clusters and to create K baseline profile models, which may be downloaded from the server at block 920. Furthermore, at block 920, an initial baseline profile model membership may be established according to one or more grammar distance metrics, which may depend on aggregate or global rule comparisons that can quantify similarities in syntactic form and individual or content-based rule comparisons that can quantify similarities in semantic meaning. As such, the initial local profile model generated at block 910, the baseline profile models downloaded at block 920, and the initial membership in the closest baseline profile model can then be used to authenticate a current user or operator associated with the electronic device and thereby detect potential theft, unauthorized usage, authorized operator changes, etc.

For example, in various embodiments, the electronic device may continue to monitor user behavior that occurs thereon in a substantially continuous manner. However, whereas the monitored behaviors used to generate the initial local profile model were observed over an initial training period L, at block 930 the electronic device may monitor the user behavior on the device and rebuild a new local profile model over a time period M, which may be substantially shorter than the initial training period L (e.g., the time period M may be on the order of minutes or hours versus the initial training period L spanning one or more days, weeks, etc.). In various embodiments, at block 940, the new (rebuilt) local profile model over the time period M may be compared to each baseline profile model that was downloaded at block 920. For example, the comparison at block 940 may comprise comparing the new local profile model to the downloaded baseline profile models and determining syntactic and/or semantic similarities therebetween according to one or more grammar distance metrics. As such, the comparison module may determine a net/normalized distance from the new local profile model to each baseline profile model and identify the baseline profile model closest to the new local profile model accordingly.

In various embodiments, at block 950, the electronic device may determine whether the new profile model from the current observation period is closest to the same baseline profile model in which the initial membership was established. Accordingly, in response to determining that the (current) new profile model is still closest to the same baseline profile model as the local profile model generated during the training phase, the current user or operator may be authenticated at block 960 according to a confidence measure X. However, in response to a determination that the current profile model is closest to a different baseline profile model than the original local profile model, a change in operator from the original local profile model may be inferred, which may cause one or more actions to occur. For example, possible actions may include comparing the current local profile model to local profile models that are associated with one or more authorized users at block 970, which assumes that sufficient "training" behavior was observed with respect to the other authorized users to create local profile models associated therewith. Accordingly, in response to determining that the current local profile model matches the local profile model associated with another authorized user at block 970 (e.g., where a distance from the current local profile model to the local profile model associated with the authorized user is under a certain threshold), an operator change notification may be generated to that effect at block 980. Alternatively, where block 970 results in a determination that the current local profile model does not match the local profile models associated with any authorized users to a sufficient confidence level (or where there are no authorized secondary users that engaged in sufficient training behavior to perform the comparison at block 970), one or more recovery and/or protective actions may be triggered at block 990. For example, the recovery and/or protective actions may comprise having the device broadcast a current or most recent position fix to thereby assist in finding or otherwise recovering the device. In another example, the recovery and/or protective actions may include starting a procedure to protect data stored on the device and shutting the device down to prevent the unauthorized operator from continuing to use the electronic device. Of course, those skilled in the art will appreciate that various other recovery and/or protective actions may be taken once the device is suspected to be lost or stolen based on the deviation between the profile model representing the initial training behavior and the behaviors that occurred in the current observation and behavioral analysis period.

Figure 10:
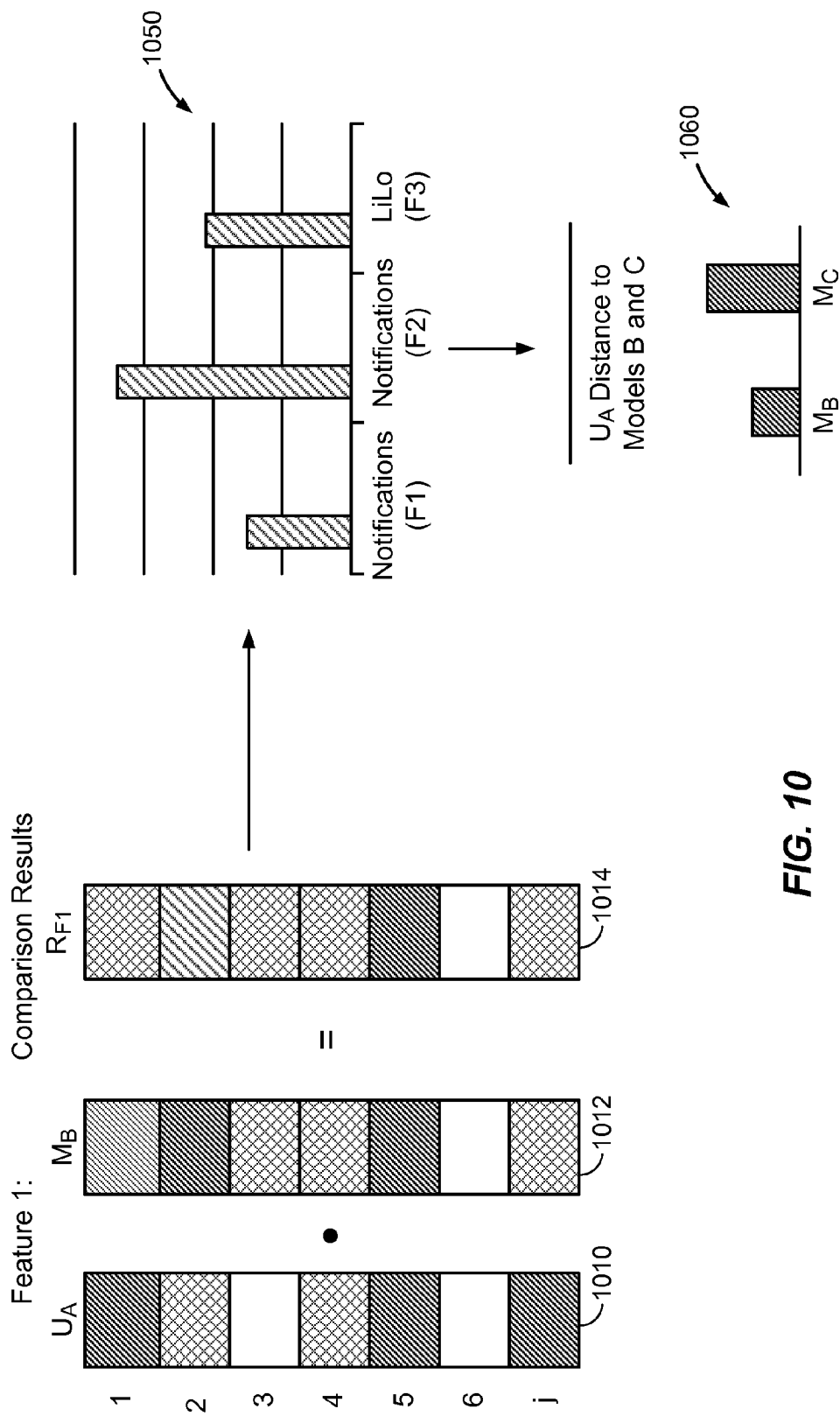
FIG. 10 illustrates an exemplary methodology to generate feature vectors from behavior monitored on an electronic device to obtain data points that can facilitate detecting electronic device theft or unauthorized usage, according to various aspects.
Figure 11:
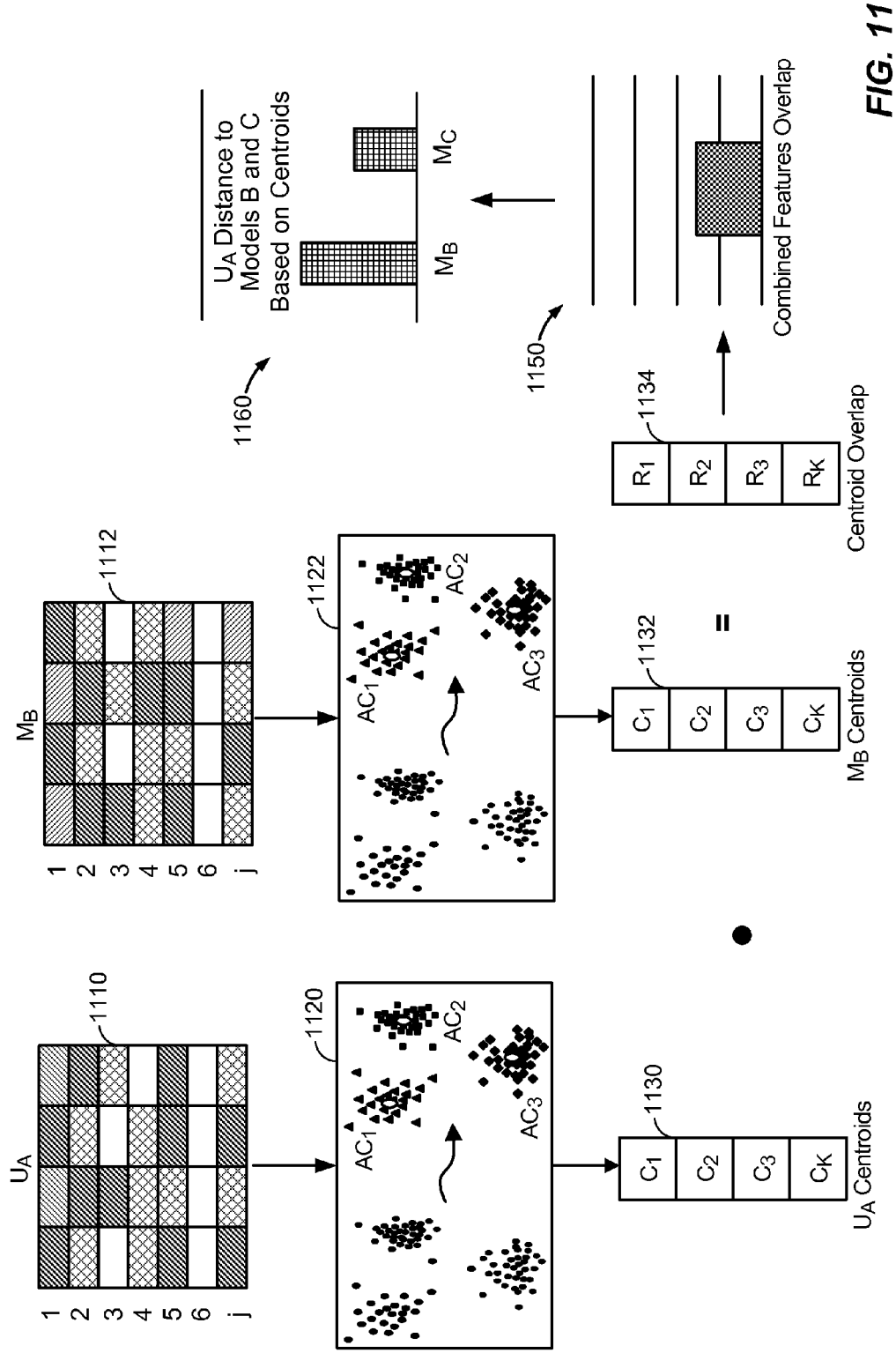
FIG. 11 illustrates an exemplary methodology to cluster feature vectors representing behavior monitored on an electronic device into centroids that can be compared to detect electronic device theft or unauthorized usage, according to various aspects.
Figure 12:
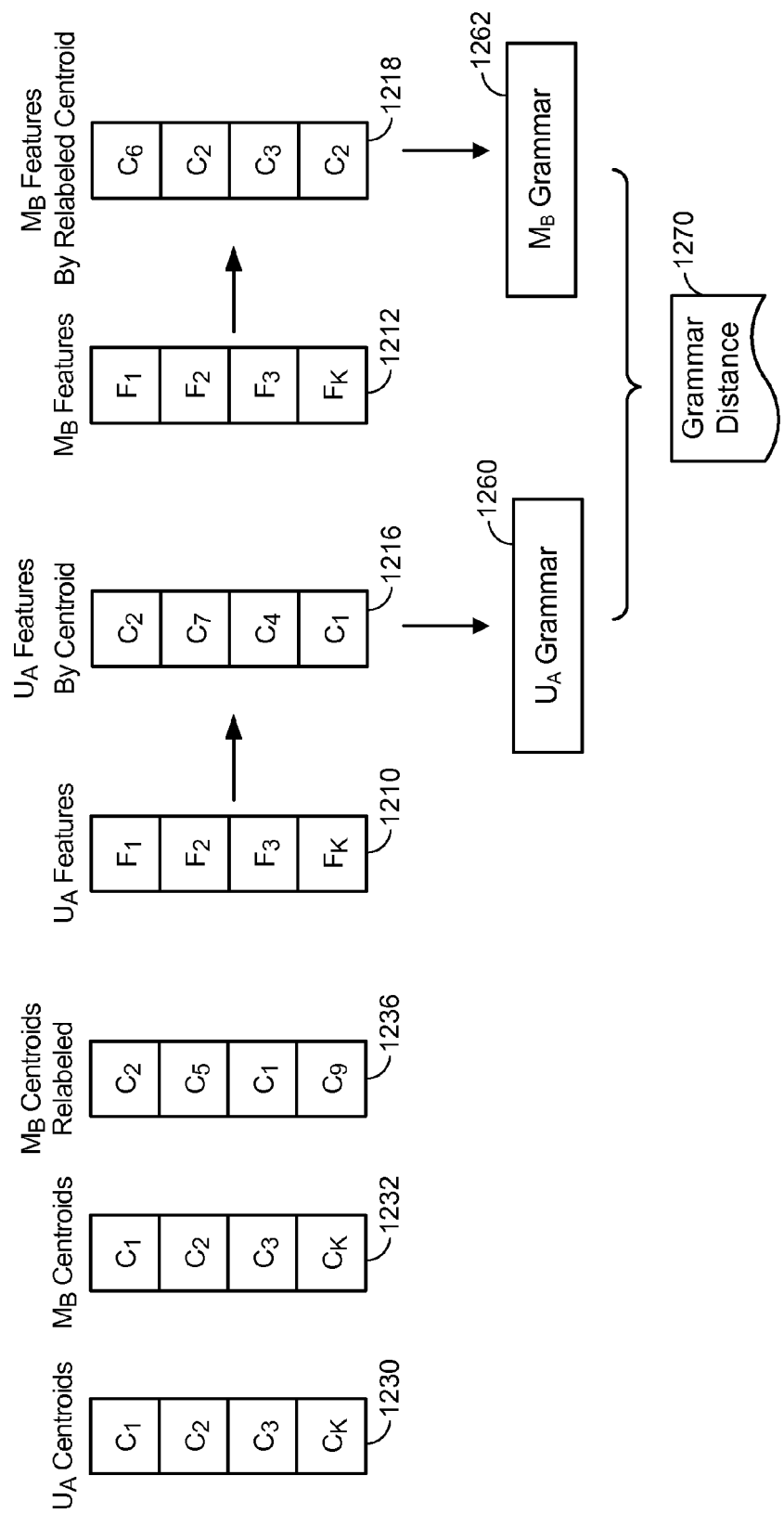
FIG. 12 illustrates an exemplary methodology to create grammars that can be compared to determine whether user behavior in the grammars indicates possible electronic device theft or unauthorized usage, according to various aspects.

According to various aspects, the following description with respect to FIG. 10 through FIG. 12 provides more detail in relation to the manner in which behaviors that are observed during a current user authentication period may be compared with various baseline profile models in order to determine whether a current device user or device operator is authorized. More particularly, the following description generally assumes that behaviors associated with each authorized user have been observed over a sufficient training period to derive an initial profile model associated therewith, and the following description further assumes that the initial profile model associated with each authorized user has been compared to each baseline profile model and had membership established in the closest baseline profile model. In that context, the methodology shown in FIG. 10 through FIG. 12 to determine whether a current device user or device operator is authorized may generally comprise combining various data sources to create feature vectors, creating a clustered model from the feature vectors, creating data grammars that re-expresses the feature vectors according to the clusters in which the feature vectors reside, and comparing the data grammars according to appropriate distance metrics that quantify syntactic and/or semantic similarities therebetween.

For example, referring first to FIG. 10, the methodology to determine whether a current device user or device operator is authorized may initially comprise generating one or more feature vectors 1010 (hereinafter "observed feature vectors") that represent user-specific behaviors observed in a current authentication interval that comprises a time period M in order to obtain the input data points needed to facilitate the user identity verification procedures. Accordingly, a dot product may be calculated between the observed feature vectors 1010 and feature vectors 1012 (hereinafter "baseline feature vectors") associated with each baseline profile model downloaded from the server. For example, because the clustering algorithms described herein generally assume original data streams that include data items (i.e., behaviors) arranged according to a time sequence such that the behaviors can be clustered as points (or feature vectors) in a Euclidean space, the dot product between the observed feature vectors 1010 and the baseline feature vectors 1012 may be expressed geometrically based on notions that relate to angles and distance (e.g., vector magnitudes). Accordingly, the dot product between the observed feature vectors 1010 and the baseline feature vectors 1012 may comprise the product of the Euclidean magnitudes associated with each observed feature vector 1010 and the respective baseline feature vector 1012 compared thereto and the cosine of the angle between the compared features 1010, 1012. In various embodiments, taking the dot product between the observed feature vectors 1010 and the baseline feature vectors 1012 may produce a comparison results vector 1014 that reflects the similarity (or dissimilarity) between the observed feature vector 1010 and the baseline feature vector 1012 compared thereto. For example, in FIG. 10, the observed feature vector 1010 represents observed notification features 1 . . . j (Feature $F_1$) with respect to the current user ($U_A$) and the baseline feature vector 1012 represents notification features 1 . . . j with respect to a modeled user ($M_B$), whereby the comparison results vector 1014 representing the distance between the observed feature vector 1010 and the baseline feature vector 1012 with respect to Feature $F_1$ may be plotted as shown in the vertical bar labeled "Notifications (F1)" in a graph 1040 that may be created to show overlapping data points during a specified time interval. The distances over the dot products associated with all compared feature vectors 1010, 1012 may be summed to obtain a total distance metric from the current user $U_A$ to each baseline profile model $M_A$, $M_B$, etc., as shown at 1050.

Referring now to FIG. 11, the methodology to determine whether the current user $U_A$ is authorized may further comprise combining and clustering the feature vectors 1110, 1112 to create the K centroids 1120, 1122. Furthermore, syntactic and/or semantic similarities between the K centroids 1120, 1122 may be measured according to one or more of the grammar distance metrics described in further detail above in order to compare the centroids 1120, 1122 to one another. For example, in various embodiments, centroid $C_1$ in the centroids 1130 associated with user $U_A$ may be compared to centroids $C_1, C_2, C_3, \ldots C_k$ in the centroids 1132 associated with baseline profile model B ($M_B$) to find the closest centroid 1130 associated with user $U_A$ to each centroid associated with profile model $M_B$, which may reflect a centroid overlap 1134 between the centroids 1130, 1132. The minimum distances between the corresponding centroids may then be summed to obtain a cumulative minimum distance measure, as shown at 1140, whereby the distance from the current user $U_A$ to each baseline profile model $M_A$, $M_B$, etc. may be determined based on the centroids 1130, 1132, as shown at 1150. Accordingly, in various embodiments, user identities can start to be authenticated according to the distance measure shown at 1150.

Referring now to FIG. 12, the methodology to determine whether the current user $U_A$ is authorized may comprise re-expressing the data points to create respective data grammars 1260, 1262 that can then be compared according to the various grammar distance metrics described in further detail above. For example, in various embodiments, the centroids 1232 in baseline profile model $M_B$ may be reordered to minimize the distance from the centroids 1230 in the current user profile model $U_A$, and the centroids in baseline profile model $M_B$ may be re-labeled to reflect the new order, as shown at 1236. Next, the original data points may be associated with the respective centroids corresponding thereto.

For example, the behavior features 1210 observed with respect to user $U_A$ may be re-expressed according to the corresponding $U_A$ centroids 1230, as shown at 1214. In a similar respect, the behavior features 1212 modeled in baseline profile model $M_B$ may be re-expressed according to the corresponding $M_B$ centroids 1232, as shown at 1216. Accordingly, a grammar 1260 associated with the current user $U_A$ may be generated from the $U_A$ features by centroid 1214, which re-express the original $U_A$ features 1210 according to the $U_A$ centroids 1230. Furthermore, a grammar 1262 associated with the baseline profile model $M_B$ may be generated from the $M_B$ features by relabeled centroid 1216, which re-express the $M_B$ features 1212 according to the relabeled $M_B$ centroids 1236. In various embodiments, the resulting grammars 1260, 1262 may be compared to calculate a distance 1270 therebetween, and a similar methodology as described above with respect to FIG. 10 through FIG. 12 may be performed for each other baseline profile model M. Accordingly, the resulting grammar distances 1270 may be compared to find the baseline profile model $M_i$ closest to the current user $U_A$, wherein the current user $U_A$ may be authenticated according to an X confidence measure if the current user $U_A$ is still closest to the same baseline profile $M_i$ as from the training phase. Otherwise, if the current user $U_A$ is closest to a different baseline profile $M_i$ from the training phase, a different user can be assumed to be operating the device and appropriate investigatory and/or remedial actions may be taken (e.g., determining whether the current user corresponds to some other authorized user, triggering actions to protect data stored on the device, etc.).

Figure 13:
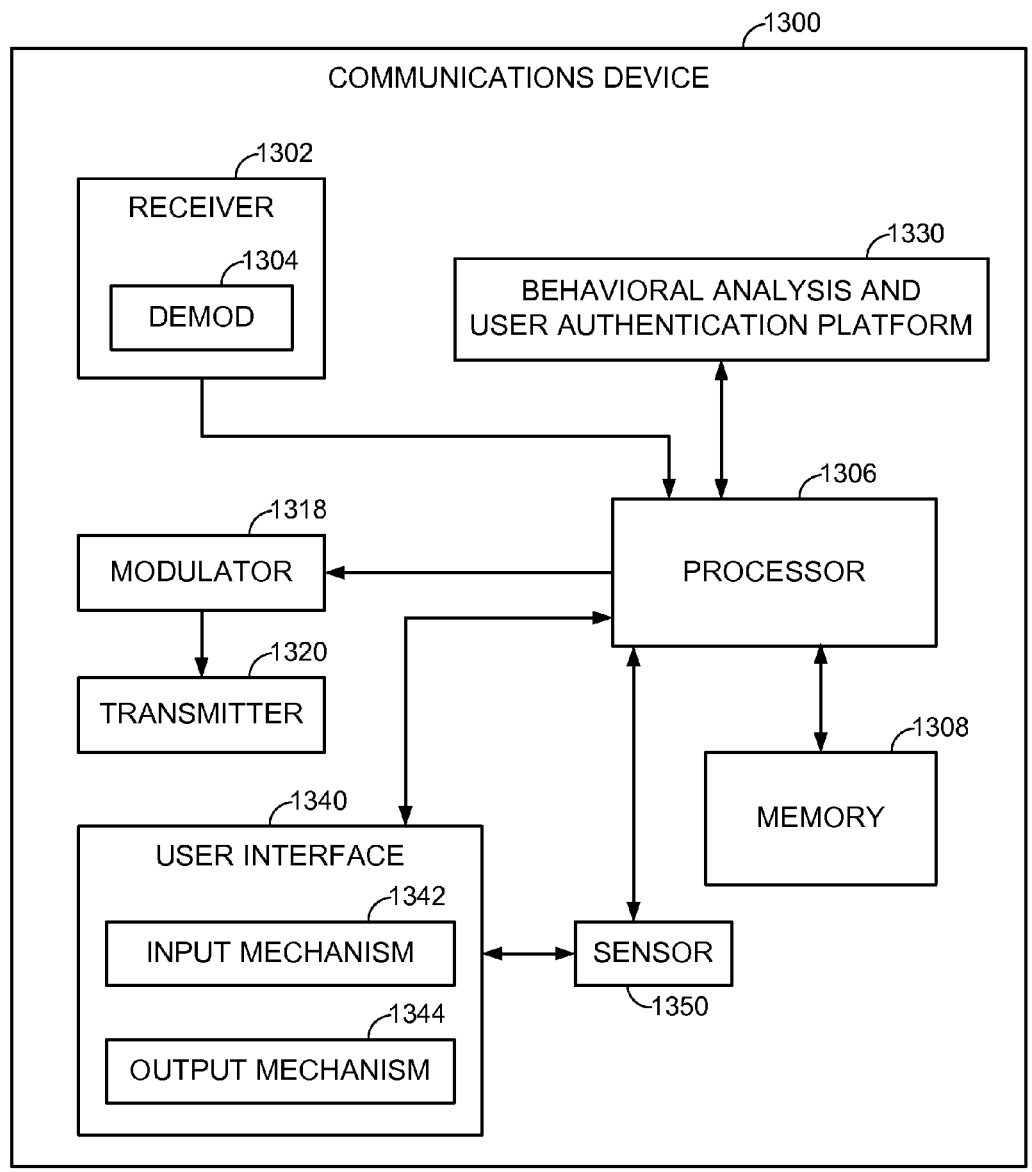
FIG. 13 illustrates an exemplary communications device that may support behavioral analysis to detect theft or unauthorized usage, according to various aspects.

According to various aspects, FIG. 13 illustrates an exemplary communications device 1300 that may support behavioral analysis to detect theft or unauthorized usage, which may correspond to one example configuration of the behavioral analysis system 470 described above in relation to FIG. 4 and/or the electronic device 710 described above in relation to FIG. 7. In particular, as shown in FIG. 13, the communications device 1300 may comprise a receiver 1302 that may receive a signal from, for instance, a receive antenna (not shown), perform typical actions on the received signal (e.g., filtering, amplifying, downconverting, etc.), and digitize the conditioned signal to obtain samples. The receiver 1302 can comprise a demodulator 1304 that can demodulate received symbols and provide them to a processor 1306 for channel estimation. The processor 1306 can be dedicated to analyzing information received by the receiver 1302, generating information that can be modulated by a modulator 1318 for transmission by a transmitter 1320, controlling one or more components of the communications device 1300, and/or any suitable combination thereof.

In various embodiments, the communications device 1300 can additionally comprise a memory 1308 operatively coupled to the processor 1306, wherein the memory 1308 can store received data, data to be transmitted, information related to available channels, data associated with analyzed signal and/or interference strength, information related to an assigned channel, power, rate, or the like, and any other suitable information for estimating a channel and communicating via the channel. In various embodiments, the memory 1308 can include one or more instructions associated with one or more applications 1330 that may execute on the processor 1306, wherein the applications 1330 may comprise a behavioral analysis and user authentication platform similar to the platform 720 described above with respect to FIG. 7. The memory 1308 can additionally store protocols and/or algorithms associated with estimating and/or utilizing a channel (e.g., performance based, capacity based, etc.).

Those skilled in the art will appreciate that the memory 1308 and/or other data stores described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1308 in the subject systems and methods may comprise, without being limited to, these and any other suitable types of memory.

Additionally, in various embodiments, the communications device 1300 may include a user interface 1340, which may include one or more input mechanisms 1342 for generating inputs into the communications device 1300, and one or more output mechanisms 1344 for generating information for consumption by the user of the communications device 1300. For example, the input mechanisms 1342 may include a mechanism such as a microphone that can be used to receive and/or detect audio inputs, a camera that can capture and/or detect visual inputs, in addition to a key or keyboard, mouse, touch-screen display, etc. that can receive and/or detect other input types. Further, for example, the output mechanisms 1344 may include a display, an audio speaker, a haptic feedback mechanism, a Personal Area Network (PAN) transceiver etc. In the illustrated aspects, the output mechanisms 1344 may include an audio speaker operable to render media content in an audio form, a display operable to render media content in an image or video format, and/or other suitable output mechanisms.

Furthermore, in various embodiments, the communications device 1300 may include one or more sensors 1350 that can detect inflicted motion or other metrics that may indicate a usage state associated with the communications device 1300. In another example, the one or more sensors 1350 may monitor activity associated with the processor 1306 to detect the usage state associated with the communications device 1300 according to activity that may not be indicated via inflicted motion or other suitable motion metrics.

Accordingly, in various embodiments, the various components associated with the communications device 1300 may be used to monitor behaviors that occur thereon, which may be subject to one or more clustering algorithms to re-express the monitored behaviors according to a profile model that comprises various centroids mapped to the monitored behaviors and a data grammar that represents the centroids according to a sequence and one or more rules that represent one or more patterns that repeat in the centroid sequence. As such, in various embodiments, the profile model may be transmitted (e.g., via the transmitter 1320) to an external entity that uses the profile model in addition to profile models received from various other devices, which may be clustered together to form various "baseline" profile models. The communications device 1300 may then download the baseline profile models via the receiver 1302, store the local profile model and the downloaded profile models in the memory 1308, and invoke the behavioral analysis and user authentication platform 1330 to compare models that represent subsequent behaviors observed on the communications device 1300 to the baseline profile models and thereby determine whether the current user or operator is the same person who engaged in the behaviors that resulted in the original local profile model (e.g., based on whether the models created from the subsequent behaviors are closest to the same baseline profile model as the original local profile model).

Figure 14:
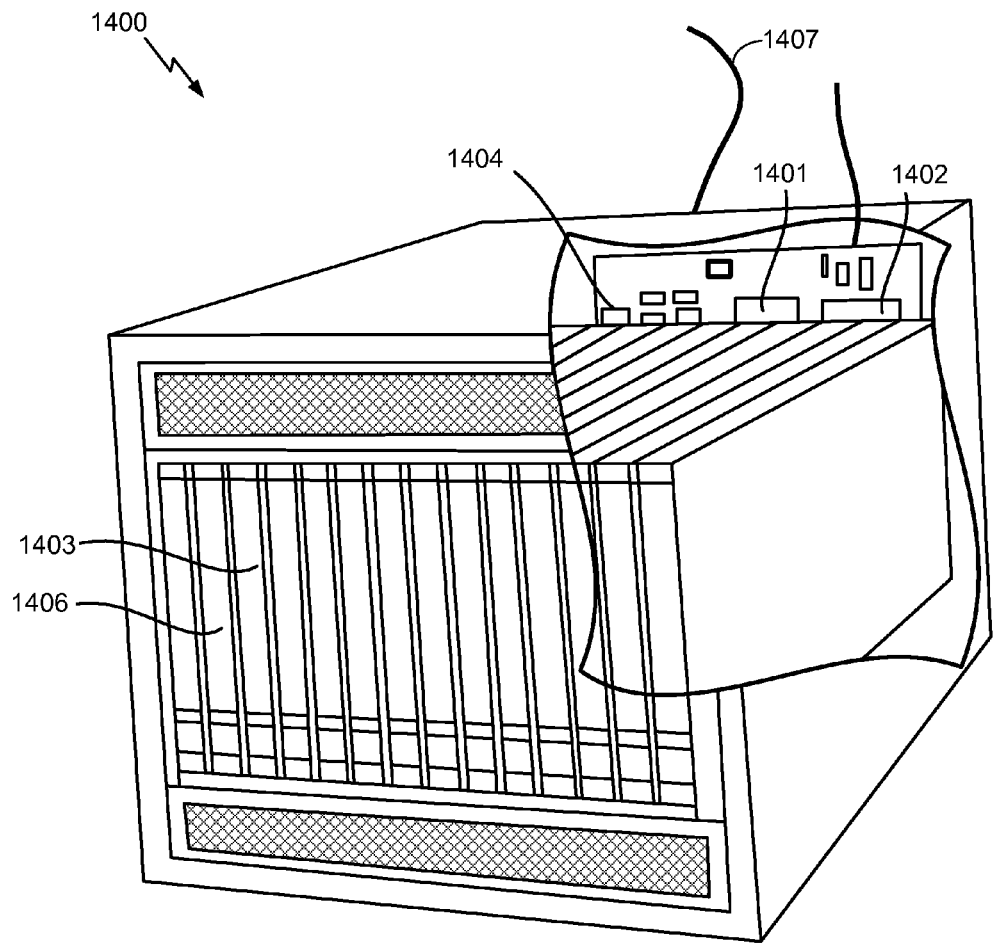
FIG. 14 illustrates an exemplary server that may construct baseline profile models from behavioral models generated at various electronic devices to support the electronic devices in detecting theft or unauthorized usage, according to various aspects.

According to various aspects, FIG. 14 illustrates an exemplary server 1400 that may construct baseline profile models from behavioral models generated at various electronic devices to support the electronic devices in detecting theft or unauthorized usage. In various embodiments, the server 1400 may comprise a commercially available server device, which may correspond to one example configuration of the behavioral analysis system 470 described above in relation to FIG. 4 and/or the security server 780 described above in relation to FIG. 7. Accordingly, the server 1400 may provide certain functions that can be used to construct baseline profile models from behavioral profile models that are generated at various electronic devices, which may then be returned to the electronic devices to assist with detecting theft or unauthorized device usage and tracked over time to create anonymous user behavior profiles. For example, according to various embodiments, the server 1400 shown in FIG. 14 may include a processor 1401 coupled to volatile memory 1402 and a large capacity nonvolatile memory, such as a disk drive 1403. The server 1400 may also include a floppy disc drive, compact disc (CD) or DVD disc drive 1406 coupled to the processor 1401. The server 1400 may also include network access ports 1404 coupled to the processor 1401 for establishing data connections with a network 1407, such as a local area network coupled to other broadcast system computers and servers or to the Internet. For example, in various embodiments, the server 1400 may use the network access points 1404 to communicate over the network 1407 and thereby receive the local profile models transmitted from the electronic devices, which may be stored in any combination of the volatile memory 1402, the disk drive 1403 and/or the disc drive 1406. The processor 1401 may then cluster the local profile models received from the electronic devices to create various baseline profile models, which may likewise be stored in any combination of the volatile memory 1402, the disk drive 1403 and/or the disc drive 1406. The processor 1401 may further calculate one or more distance metrics to quantify the semantic and/or syntactic similarity between the local profile models received from the electronic devices and each baseline profile model, register each local profile model as a member within the particular baseline profile model closest to the respective local profile model, and track the baseline profile model membership associated with each user profile model over time in order to create and maintain anonymous user behavior profiles. Furthermore, the server 1400 may use the network access points 1404 to communicate over the network 1407 and thereby transmit the baseline profile models to the electronic devices, which may use the baseline profile models to perform model comparisons that can be used to detect theft, unauthorized device usage, and/or other operator changes at a local level.

Figure 15:
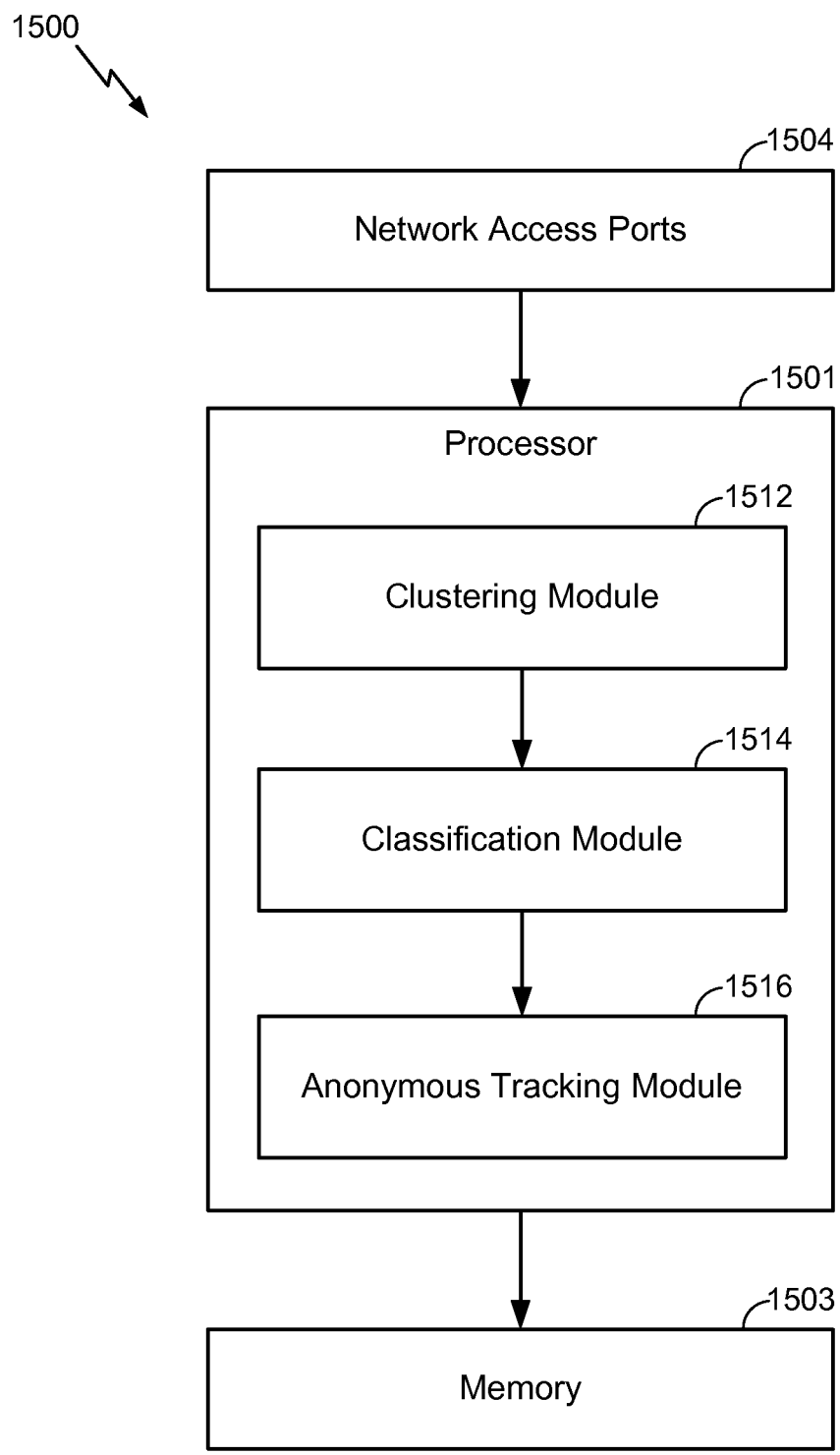
FIG. 15 illustrates an exemplary modular architecture associated with a server that may construct baseline profile models to support electronic devices in detecting theft or unauthorized usage, according to various aspects.

According to various aspects, FIG. 15 illustrates an exemplary modular architecture associated with a server 1500 that may construct baseline profile models to support electronic devices in detecting theft or unauthorized usage, wherein the server 1500 shown in FIG. 15 may correspond to one example configuration of the behavioral analysis system 470 described above in relation to FIG. 4 and/or the servers 780, 1400 described above FIG. 7 and FIG. 14, respectively.

For example, in various embodiments, the server 1500 may include one or more network access ports 1504 that can receive local profile models transmitted from various electronic devices, which may be stored in a memory 1503. In various embodiments, the server 1500 may further comprise a processor 1501 having a clustering module 1512 that can cluster the local profile models uploaded from the various electronic devices to create a set of baseline profile models, which may likewise be stored in the memory 1503. In various embodiments, the baseline profile models created at the clustering module 1512 may each comprise various centroids arranged in a sequence in which each centroid is assigned a terminal symbol and the sequence includes one or more repeating patterns, structures, sub-patterns, sub-structures, etc. in the symbol sequence that represents the sequenced centroids. As such, the clustering module 1512 may create one or more rules to represent the repeating patterns, structures, sub-patterns, sub-structures, etc. in the centroid sequence, create one or more hierarchical and/or nested rules that reference other rules (if applicable), and flatten each rule such that only terminal symbols remain except that the zeroth rule that represents the original symbol sequence is not flattened.

In various embodiments, the processor 1501 may further comprise a classification module 1514 that may compare the local profile model uploaded from each device to the baseline profile models created therefrom and calculate one or more distance metrics to quantify the semantic and/or syntactic similarity between the local profile models and each baseline profile model. Accordingly, the classification module 1514 may register each local profile model as a member within the particular baseline profile model closest to the respective local profile model. For example, as described in further detail above, the distance metrics used to classify the local profile models into the closest baseline profile model may be based on aggregate (e.g., global) rule comparisons that can be used to quantify similarities in syntactic form and individual (e.g., content-based) rule comparisons that can be used to quantify similarities in semantic meaning. As such, depending on the particular distance metric(s) used, the classification module 1514 may identify one baseline profile model closest to each respective local profile model such that each local profile model may be assigned membership in the closest baseline profile model. Furthermore, the processor 1501 may include an anonymous tracking module 1516 that may track the baseline profile model membership associated with each user profile model over time in order to create and maintain anonymous user behavior profiles.

In various embodiments, the local profile models received via the network access ports 1504, the baseline profile models created at the clustering module 1512, the distance metrics calculated with respect to each local profile model at the classification module 1514, and the membership associated with each local profile model may be stored in the memory 1503. Furthermore, the server 1500 can transmit the baseline profile models constructed from the aggregate local profile models that were uploaded to the server 1500 to the electronic devices that uploaded the same to the server 1500 and/or one or more other devices or servers via the network access ports 1504, which may then use the baseline profile models to perform model comparisons that can be used to detect theft, unauthorized device usage, and/or other operator changes at a local level.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device (e.g., an IoT device). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for detecting unauthorized electronic device usage, comprising:
    generating one or more training feature vectors that represent one or more user-specific behaviors observed on an electronic device over a predefined training period L;
    generating a local user profile model from the one or more training feature vectors, wherein the local user profile model re-expresses the one or more user-specific behaviors observed over the predefined training period L according to K centroids that indicate a temporal context associated therewith;
    transmitting, by the electronic device, the local user profile model to a server, wherein the server is configured to execute a clustering algorithm on the local user profile model transmitted from the electronic device and local user profile models transmitted from one or more other electronic devices to create plural baseline profile models;
    receiving, from the server, the plural baseline profile models and information indicating one of the plural baseline profile models in which the electronic device has membership;
    generating one or more feature vectors representing a temporal context associated with one or more user-specific behaviors observed on the electronic device, wherein the user-specific behaviors are observed from sensor data acquired on the electronic device;
    generating a current user profile model from the one or more feature vectors, wherein the current user profile model comprises a centroid sequence that re-expresses the temporal context associated with the one or more user-specific behaviors and a data grammar that defines one or more rules to represent patterns in the centroid sequence;
    comparing the current user profile model generated from the one or more feature vectors to the plural baseline profile models stored at the electronic device to identify one of the plural baseline profile models closest to the current user profile model; and
    detecting an operator change at the electronic device in response to determining that the baseline profile model closest to the current user profile model differs from the baseline profile model in which the electronic device has membership.

2. The method recited in claim 1, wherein the server is further configured to classify the local user profile model transmitted from the electronic device into one of the plural baseline profile models closest to the local user profile model, wherein the baseline profile model in which the electronic device has membership corresponds to the baseline profile model closest to the local user profile model.

3. The method recited in claim 1, wherein the one or more user-specific behaviors used to generate the current user profile model are observed over an authentication period M that is substantially shorter than the predefined training period L.

4. The method recited in claim 1, wherein the plural baseline profile models created at the server comprise K baseline profile models.

5. The method recited in claim 1, wherein the server is further configured to track the membership associated with the electronic device over time to maintain an anonymous user behavior profile associated with the electronic device.

6. The method recited in claim 1, wherein comparing the current user profile model to the plural baseline profile models comprises:
   calculating one or more metrics that define a distance from the current user profile model to each baseline profile model to quantify a similarity between the data grammar associated with the current user profile model and each baseline profile model; and
   identifying one of the plural baseline profile models having a smallest distance from the current user profile model, wherein the identified baseline profile model corresponds to the baseline profile model closest to the current user profile model.

7. The method recited in claim 6, wherein the one or more calculated metrics comprise at least one metric that quantifies the similarity between the data grammar associated with the current user profile model and each baseline profile model according to a global comparison between the one or more rules defined in the data grammar associated with the current user profile model and each baseline profile model.

8. The method recited in claim 6, wherein the one or more calculated metrics comprise at least one metric that quantifies the similarity between the data grammar associated with the current user profile model and each baseline profile model according to a content-based comparison between one or more individual rules in the data grammar associated with the current user profile model and each baseline profile model.

9. The method recited in claim 1, further comprising:
   authenticating a current operator associated with the electronic device in response to determining that the baseline profile model closest to the current user profile model matches the baseline profile model in which the electronic device has membership.

10. The method recited in claim 1, further comprising:
    triggering one or more of a recovery action or a protective action in response to detecting the operator change.

11. The method recited in claim 1, wherein the electronic device has at least one of an accelerometer, a gyroscope, or a touchscreen configured to acquire the sensor data.

12. The method recited in claim 1, wherein the one or more user-specific behaviors include at least one of pulling the electronic device from a pocket, motion of the electronic device when walking, unlocking the electronic device, entering data into the electronic device, or answering a call received at the electronic device.

13. A method for detecting unauthorized electronic device usage, comprising:
    storing plural baseline profile models at an electronic device, wherein the electronic device has membership in one of the plural baseline profile models;
    generating one or more feature vectors representing a temporal context associated with one or more user-specific behaviors observed on the electronic device, wherein the one or more user-specific behaviors are observed from sensor data acquired on the electronic device;
    generating a current user profile model from the one or more feature vectors, wherein the current user profile model represents one or more patterns in the temporal context associated with the one or more user-specific behaviors;
    comparing the current user profile model generated from the one or more feature vectors to the plural baseline profile models stored at the electronic device to identify one of the plural baseline profile models closest to the current user profile model;
    detecting an operator change at the electronic device in response to determining that the baseline profile model closest to the current user profile model differs from the baseline profile model in which the electronic device has membership;
    comparing the current user profile model to one or more authorized user profile models stored on the electronic device in response to the detected operator change; and
    generating a notification indicating that a current operator is authorized to use the electronic device in response to determining that a distance from the current user profile model to at least one of the authorized user profile models is under a threshold value.

14. The method recited in claim 13, further comprising:
    triggering one or more of a recovery action or a protective action in response to determining that the distance from the current user profile model to each authorized user profile is above the threshold value.

15. An electronic device, comprising:
    means for generating one or more training feature vectors that represent one or more user-specific behaviors observed on the electronic device over a training period;
    means for generating a local user profile model from the one or more training feature vectors, wherein the local user profile model re-expresses the one or more user-specific behaviors observed over the training period according to one or more centroids that indicate a temporal context associated therewith;
    means for transmitting the local user profile model to a server, wherein the server is configured to execute a clustering algorithm on the local user profile model transmitted from the electronic device and local user profile models transmitted from one or more other electronic devices to create plural baseline profile models;
    means for receiving, from the server, the plural baseline profile models and information indicating one of the plural baseline profile models in which the electronic device has membership;
    means for generating one or more feature vectors representing a temporal context associated with one or more user-specific behaviors observed from sensor data acquired on the electronic device;
    means for generating a current user profile model from the one or more feature vectors, wherein the current user profile model comprises a centroid sequence that re-expresses the temporal context associated with the one or more user-specific behaviors and a data grammar that defines one or more rules to represent patterns in the centroid sequence;
    means for comparing the current user profile model generated from the one or more feature vectors to the plural baseline profile models to identify one of the plural baseline profile models closest to the current user profile model; and means for detecting an operator change at the electronic device according to whether the baseline profile model closest to the current user profile model differs from the baseline profile model in which the electronic device has membership.

16. The electronic device recited in claim 15, wherein the means for comparing the current user profile model to the plural baseline profile models comprises:
   means for calculating one or more metrics that define a distance from the current user profile model to each baseline profile model; and
   means for identifying one of the plural baseline profile models having a smallest distance from the current user profile model, wherein the identified baseline profile model corresponds to the baseline profile model closest to the current user profile model.

17. The electronic device recited in claim 16, wherein the one or more calculated metrics comprise at least one metric that quantifies a similarity between the data grammar associated with the current user profile model and each baseline profile model according to one or more of a global comparison between the one or more rules defined in the data grammar associated with the current user profile model and each baseline profile model or a content-based comparison between one or more individual rules in the data grammar associated with the current user profile model and each baseline profile model.

18. The electronic device recited in claim 15, further comprising:
   means for authenticating a current operator in response to a determination that the baseline profile model closest to the current user profile model matches the baseline profile model in which the electronic device has membership.

19. The electronic device recited in claim 15, further comprising:
   means for triggering one or more of a recovery action or a protective action in response to the operator change.

20. An electronic device, comprising:
   means for storing plural baseline profile models, wherein the electronic device has membership in one of the plural baseline profile models;
   means for generating one or more feature vectors representing a temporal context associated with one or more user-specific behaviors observed from sensor data acquired on the electronic device;
   means for generating a current user profile model from the one or more feature vectors, wherein the current user profile model represents one or more patterns in the temporal context associated with the one or more user-specific behaviors;
   means for comparing the current user profile model generated from the one or more feature vectors to the plural baseline profile models to identify one of the plural baseline profile models closest to the current user profile model;
   means for detecting an operator change at the electronic device in response to the baseline profile model closest to the current user profile model differing from the baseline profile model in which the electronic device has membership;
   means for comparing the current user profile model to one or more authorized user profile models in response to the detected operator change; and
   means for generating a notification indicating that a current operator is authorized to use the electronic device in response to a distance from the current user profile model to at least one of the authorized user profile models being under a threshold value.

21. The electronic device recited in claim 20, further comprising:
   means for triggering one or more of a recovery action or a protective action in response to the distance from the current user profile model to each authorized user profile being above the threshold value.

22. An electronic device, comprising:
   a local repository configured to store plural baseline profile models, wherein the electronic device has membership in one of the plural baseline profile models;
   one or more sensors configured to acquire sensor data;
   one or more processors;
   a behavioral analysis platform configured to execute on the one or more processors, wherein the behavioral analysis platform is configured to generate one or more training feature vectors that represent one or more user-specific behaviors observed on the electronic device over a training period and to generate a local user profile model that re-expresses the one or more user-specific behaviors observed over the training period according to one or more centroids that indicate a temporal context associated therewith;
   a transmitter configured to transmit the local user profile model to a server, wherein the server is configured to execute a clustering algorithm on the local user profile model transmitted from the electronic device and local user profile models transmitted from one or more other electronic devices to create the plural baseline profile models;
   a receiver configured to receive, from the server, the plural baseline profile models and information indicating the one of the plural baseline profile models in which the electronic device has membership; and
   a user authentication platform configured to execute on the one or more processors, wherein the user authentication platform is configured to:
      generate one or more feature vectors representing a temporal context associated with one or more user-specific behaviors observed from the acquired sensor data;
      map the one or more feature vectors to a centroid sequence that re-expresses the temporal context associated with the one or more user-specific behaviors;
      generate a current user profile model, wherein the current user profile model comprises the centroid sequence mapped to the one or more feature vectors and a data grammar that defines one or more rules to represent patterns in the centroid sequence; and
      identify one of the plural baseline profile models closest to the current user profile model; and
      detect an operator change according to whether the baseline profile model closest to the current user profile model differs from the baseline profile model in which the electronic device has membership.

23. The electronic device recited in claim 22, wherein the user authentication platform is further configured to:
   calculate one or more metrics that define a distance from the current user profile model to each baseline profile model; and
   identify one of the plural baseline profile models having a smallest distance from the current user profile model, wherein the identified baseline profile model corresponds to the baseline profile model closest to the current user profile model.

24. The electronic device recited in claim 23, wherein the one or more calculated metrics comprise at least one metric that quantifies a similarity between the data grammar associated with the current user profile model and each baseline profile model according to one or more of a global comparison between the one or more rules defined in the data grammar associated with the current user profile model and each baseline profile model or a content-based comparison between one or more individual rules in the data grammar associated with the current user profile model and each baseline profile model.

25. The electronic device recited in claim 22, wherein the user authentication platform is further configured to authenticate a current operator in response to a determination that the baseline profile model closest to the current user profile model matches the baseline profile model in which the electronic device has membership.

26. The electronic device recited in claim 22, wherein the user authentication platform is further configured to trigger one or more of a recovery action or a protective action in response to the operator change.

27. An electronic device, comprising:
a local repository configured to store plural baseline profile models, wherein the electronic device has membership in one of the plural baseline profile models;
one or more sensors configured to acquire sensor data;
one or more processors; and
a behavioral analysis and user authentication platform configured to execute on the one or more processors, wherein the behavioral analysis and user authentication platform is configured to:
generate one or more feature vectors representing a temporal context associated with one or more user-specific behaviors observed from the acquired sensor data;
generate a current user profile model from the one or more feature vectors, wherein the current user profile model represents one or more patterns in the temporal context associated with the one or more user-specific behaviors;
compare the current user profile model generated from the one or more feature vectors to the plural baseline profile models to identify one of the plural baseline profile models closest to the current user profile model;
detect an operator change at the electronic device in response to the baseline profile model closest to the current user profile model differing from the baseline profile model in which the electronic device has membership;
compare the current user profile model to one or more authorized user profile models in response to the detected operator change; and
generate a notification indicating that a current operator is authorized to use the electronic device in response to a distance from the current user profile model to at least one of the authorized user profile models being under a threshold value.

28. The electronic device recited in claim 27, wherein the comparison module is further configured to trigger one or more of a recovery action or a protective action in response to the distance from the current user profile model to each authorized user profile being above the threshold value.

29. A computer-readable storage medium having computer-executable instructions recorded thereon, wherein executing the computer-executable instructions on an electronic device having one or more processors causes the one or more processors to:
generate one or more training feature vectors that represent one or more user-specific behaviors observed on the electronic device over a training period;
generate a local user profile model from the one or more training feature vectors, wherein the local user profile model re-expresses the one or more user-specific behaviors observed over the training period according to one or more centroids that indicate a temporal context associated therewith;
transmit the local user profile model to a server, wherein the server is configured to execute a clustering algorithm on the local user profile model transmitted from the electronic device and local user profile models transmitted from one or more other electronic devices to create plural baseline profile models;
receive, from the server, the plural baseline profile models and information indicating one of the plural baseline profile models in which the electronic device has membership;
generate one or more feature vectors representing a temporal context associated with one or more user-specific behaviors observed from sensor data acquired on the electronic device;
generate a current user profile model from the one or more feature vectors, wherein the current user profile model comprises a centroid sequence that re-expresses the temporal context associated with the one or more user-specific behaviors and a data grammar that defines one or more rules to represent patterns in the centroid sequence;
compare the current user profile model generated from the one or more feature vectors to the plural baseline profile models to identify one of the plural baseline profile models closest to the current user profile model; and
detect an operator change at the electronic device according to whether the baseline profile model closest to the current user profile model differs from the baseline profile model in which the electronic device has membership.

30. The computer-readable storage medium recited in claim 29, wherein executing the computer-executable instructions on the electronic device further causes the one or more processors to:
calculate one or more metrics that define a distance from the current user profile model to each baseline profile model; and
identify one of the plural baseline profile models having a smallest distance from the current user profile model, wherein the identified baseline profile model corresponds to the baseline profile model closest to the current user profile model.

31. The computer-readable storage medium recited in claim 30, wherein the one or more calculated metrics comprise at least one metric that quantifies a similarity between the data grammar associated with the current user profile model and each baseline profile model according to one or more of a global comparison between the one or more rules defined in the data grammar associated with the current user profile model and each baseline profile model or a content-based comparison between one or more individual rules in the data grammar associated with the current user profile model and each baseline profile model.

32. The computer-readable storage medium recited in claim 29, wherein executing the computer-executable instructions on the electronic device further causes the one or more processors to:

authenticate a current operator in response to a determination that the baseline profile model closest to the current user profile model matches the baseline profile model in which the electronic device has membership.

33. The computer-readable storage medium recited in claim 29, wherein executing the computer-executable instructions on the electronic device further causes the one or more processors to:

trigger one or more of a recovery action or a protective action in response to the operator change.

34. A computer-readable storage medium having computer-executable instructions recorded thereon, wherein executing the computer-executable instructions on an electronic device having one or more processors causes the one or more processors to:

store plural baseline profile models, wherein the electronic device has membership in one of the plural baseline profile models;

generate one or more feature vectors representing a temporal context associated with one or more user-specific behaviors observed from sensor data acquired on the electronic device;

generate a current user profile model from the one or more feature vectors, wherein the current user profile model represents one or more patterns in the temporal context associated with the one or more user-specific behaviors;

compare the current user profile model generated from the one or more feature vectors to the plural baseline profile models to identify one of the plural baseline profile models closest to the current user profile model;

detect an operator change at the electronic device in response to the baseline profile model closest to the current user profile model differing from the baseline profile model in which the electronic device has membership;

compare the current user profile model to one or more authorized user profile models in response to the detected operator change; and generate a notification indicating that a current operator is authorized to use the electronic device in response to a distance from the current user profile model to at least one of the authorized user profile models being under a threshold value.

35. The computer-readable storage medium recited in claim 34, wherein executing the computer-executable instructions on the electronic device further causes the one or more processors to:

trigger one or more of a recovery action or a protective action in response to the distance from the current user profile model to each authorized user profile being above the threshold value.

* * * * *